US012459224B2

(12) United States Patent
Walsh et al.

(10) Patent No.: US 12,459,224 B2
(45) Date of Patent: Nov. 4, 2025

(54) METHODS AND SYSTEMS FOR FORMING TRAYS

(71) Applicant: Graphic Packaging International, LLC, Atlanta, GA (US)

(72) Inventors: Joseph C. Walsh, Boulder, CO (US); Robert L. Conatser, Golden, CO (US); Mark Woodward, Lakewood, CO (US); Colin P. Ford, Woodstock, GA (US); Shawn Westerlund, Aitkin, MN (US)

(73) Assignee: Graphic Packaging International, LLC, Atlanta, GA (US)

( * ) Notice: Subject to any disclaimer, the term of this patent is extended or adjusted under 35 U.S.C. 154(b) by 12 days.

(21) Appl. No.: 18/203,957

(22) Filed: May 31, 2023

(65) Prior Publication Data

US 2023/0302756 A1 Sep. 28, 2023

Related U.S. Application Data

(63) Continuation-in-part of application No. 18/071,985, filed on Nov. 30, 2022, now Pat. No. 12,172,405.
(Continued)

(51) Int. Cl.
*B31B 50/44* (2017.01)
*B31B 50/06* (2017.01)
(Continued)

(52) U.S. Cl.
CPC .............. *B31B 50/44* (2017.08); *B31B 50/06* (2017.08); *B31B 2100/0024* (2017.08); *B31B 2110/30* (2017.08)

(58) Field of Classification Search
CPC ....... B31B 50/262; B31B 50/28; B31B 50/00; B31B 2100/0024; B31B 50/46; B31B 100/00; B31B 50/44; B31B 110/35
(Continued)

(56) References Cited

U.S. PATENT DOCUMENTS

| | | | | |
|---|---|---|---|---|
| 1,405,139 A | | 1/1922 | Bombard et al. | |
| 2,887,020 A | * | 5/1959 | Currie | B31B 50/00 493/137 |

(Continued)

FOREIGN PATENT DOCUMENTS

| | | | |
|---|---|---|---|
| CN | 2317075 Y | 5/1999 | |
| DE | 379 470 C | 8/1923 | |

(Continued)

OTHER PUBLICATIONS

International Search Report and Written Opinion for PCT/US2024/027931 dated Aug. 20, 2024.

(Continued)

*Primary Examiner* — Jacob A Smith
(74) *Attorney, Agent, or Firm* — Andrew N. Claerbout; FisherBroyles, LLC

(57) ABSTRACT

A method of forming a tray includes obtaining a blank, the blank having a plurality of panels and a plurality of end flaps foldably connected to a respective panel of the plurality of panels. The method further includes positioning the blank in a blank feeder assembly of a system for forming a tray, moving the blank to a tray forming assembly, the tray forming assembly including a tray forming assembly, the tray forming assembly including a turret assembly comprising a plurality of female tray forming members, the tray forming assembly further comprising a piston assembly including a male forming member, positioning the blank between the turret assembly and the piston assembly, and moving the piston assembly into at least partial engagement with the turret assembly to form a tray from the blank.

16 Claims, 24 Drawing Sheets

Related U.S. Application Data

(60) Provisional application No. 63/284,823, filed on Dec. 1, 2021.

(51) Int. Cl.
*B31B 100/00* (2017.01)
*B31B 110/30* (2017.01)

(58) Field of Classification Search
USPC ................ 493/183, 167, 137, 143, 174, 151
See application file for complete search history.

(56) References Cited

U.S. PATENT DOCUMENTS

| | | | | |
|---|---|---|---|---|
| 3,187,483 | A | 6/1965 | Steele et al. | |
| 3,563,000 | A * | 2/1971 | Whitehouse et al. | B65B 11/30 53/48.8 |
| 3,575,409 | A | 4/1971 | Calvert | |
| 3,872,652 | A | 3/1975 | LaBantschnig et al. | |
| 3,951,049 | A | 4/1976 | Brackmann | |
| 3,981,494 | A | 9/1976 | Prestegaard | |
| 4,034,658 | A | 7/1977 | Sherman | |
| 4,244,281 | A | 1/1981 | Kauffman et al. | |
| 4,256,526 | A | 3/1981 | McDaniel | |
| 4,331,434 | A | 5/1982 | Buschor | |
| 4,479,345 | A | 10/1984 | Nord | |
| 4,574,561 | A | 3/1986 | Dirico | |
| 4,582,315 | A | 4/1986 | Scarpa et al. | |
| 4,590,745 | A | 5/1986 | Randles | |
| 4,802,664 | A | 2/1989 | Larsen | |
| 4,815,252 | A | 3/1989 | Renard et al. | |
| 4,838,846 | A | 6/1989 | Focke et al. | |
| 4,881,934 | A | 11/1989 | Harston et al. | |
| 4,986,522 | A | 1/1991 | Paulson | |
| 5,019,029 | A | 5/1991 | Calvert | |
| 5,102,385 | A | 4/1992 | Calvert | |
| 5,102,485 | A | 4/1992 | Keeler et al. | |
| 5,176,612 | A | 1/1993 | Calvert et al. | |
| 5,188,695 | A | 2/1993 | Colton | |
| 5,254,071 | A | 10/1993 | Laroche | |
| 5,282,528 | A | 2/1994 | Hudson | |
| 5,501,065 | A | 3/1996 | Fischer et al. | |
| 5,537,806 | A | 7/1996 | Grierson et al. | |
| 5,542,349 | A | 8/1996 | Goesslinghoff | |
| 5,595,043 | A | 1/1997 | Radigan | |
| 5,632,368 | A | 5/1997 | Moncrief | |
| 5,653,671 | A | 8/1997 | Reuteler | |
| 5,657,610 | A | 8/1997 | Dietrich et al. | |
| 5,662,577 | A | 9/1997 | Reuteler | |
| 5,971,906 | A * | 10/1999 | Tharpe, Jr. | B65D 71/0096 493/131 |
| 5,980,440 | A | 11/1999 | Mitman et al. | |
| 5,992,489 | A | 11/1999 | Busse | |
| 5,997,458 | A | 12/1999 | Guttinger et al. | |
| 6,038,837 | A | 3/2000 | Odenthal | |
| 6,050,063 | A | 4/2000 | Ford et al. | |
| 6,073,423 | A | 6/2000 | House | |
| 6,146,028 | A | 11/2000 | Preszler | |
| 6,213,286 | B1 | 4/2001 | Hunter et al. | |
| 6,226,965 | B1 | 5/2001 | Lam | |
| 6,267,717 | B1 | 7/2001 | Sass et al. | |
| 6,311,457 | B1 | 11/2001 | May et al. | |
| 6,490,843 | B1 | 12/2002 | May | |
| 6,497,084 | B1 | 12/2002 | Janen | |
| 6,509,052 | B1 | 1/2003 | Benham et al. | |
| 6,550,608 | B1 | 4/2003 | Brown et al. | |
| 6,689,034 | B2 | 2/2004 | Walsh et al. | |
| 6,993,889 | B2 | 2/2006 | Ford et al. | |
| 7,070,551 | B2 | 7/2006 | Lasson | |
| 7,210,612 | B2 | 5/2007 | Walsh et al. | |
| 7,461,838 | B2 | 12/2008 | Hendricks et al. | |
| 7,530,381 | B2 | 5/2009 | Walsh et al. | |
| 7,658,318 | B2 | 2/2010 | Walsh et al. | |
| 7,695,421 | B2 | 4/2010 | Ford | |
| 7,717,322 | B2 | 5/2010 | Walsh et al. | |
| 8,226,794 | B2 | 7/2012 | Fogle | |
| 8,870,519 | B2 | 10/2014 | Karst | |
| 10,562,675 | B2 | 2/2020 | Walsh | |
| 11,325,336 | B2 | 5/2022 | Walsh | |
| 11,518,133 | B2 | 12/2022 | Walsh | |
| 11,628,967 | B2 | 4/2023 | Walsh et al. | |
| 2002/0041067 | A1 | 4/2002 | Muller | |
| 2003/0000851 | A1 | 1/2003 | Walsh | |
| 2006/0037290 | A1 | 2/2006 | Smith | |
| 2006/0197272 | A1 | 9/2006 | Hendricks et al. | |
| 2007/0042072 | A1 * | 2/2007 | Johns | B29C 43/36 425/394 |
| 2007/0063416 | A1 | 3/2007 | Kisch | |
| 2007/0085260 | A1 | 4/2007 | Hendricks et al. | |
| 2007/0257416 | A1 | 11/2007 | Ford | |
| 2007/0267374 | A1 * | 11/2007 | Middleton | B29C 45/14336 264/572 |
| 2008/0227612 | A1 | 9/2008 | Harston | |
| 2009/0087296 | A1 | 4/2009 | May et al. | |
| 2011/0166007 | A1 * | 7/2011 | Langen | B31B 50/28 493/122 |
| 2017/0305097 | A1 | 10/2017 | Räsänen et al. | |
| 2020/0139658 | A1 * | 5/2020 | Cordova | B31F 1/0035 |
| 2022/0281202 | A1 | 9/2022 | Varotto et al. | |
| 2023/0302756 | A1 | 9/2023 | Walsh | |

FOREIGN PATENT DOCUMENTS

| | | | |
|---|---|---|---|
| DE | 10 2007 057114 | A1 | 5/2008 |
| DE | 10 2016 203204 | A1 | 9/2016 |
| EP | 3 231 722 | A1 | 10/2017 |
| GB | 1 355 270 | A | 6/1974 |
| JP | 08-000680 | U | 4/1996 |
| JP | H08680 | | 4/1996 |
| JP | 2014-226835 | A | 12/2014 |
| JP | 2019-206116 | A | 12/2019 |
| KR | 10-2014-0002921 | A | 1/2014 |
| KR | 10-1787026 | B1 | 10/2017 |
| WO | WO 2022/009062 | A2 | 1/2022 |

OTHER PUBLICATIONS

International Search Report and Written Opinion for PCT/US2022/051355 dated Apr. 14, 2023.
Anthony Kim, 'EST System DAKIOU's double tray,' YouTube [online] [video], Jul. 18, 2019 [retrieved on Apr. 4, 2023], retrieved from <https://www.youtube.com/watch?v=Fo3hEHRpylw&ab_channel=AnthonyKim>, pp. 1-11.
Office Action for U.S. Appl. No. 18/071,985, filed Mar. 30, 2022.
Amendment A and Response to Office Action for U.S. Appl. No. 18/071,985 dated Aug. 8, 2024, 1 page.
Issue Fee Transmittal Form for U.S. Appl. No. 18/071,985 dated Nov. 15, 2024, 3 pages.
Issue Notification for U.S. Appl. No. 18/071,985 dated Dec. 4, 2024, 2 pages.
Notice of Allowance and Fee(s) Due for U.S. Appl. No. 18/071,985 dated Aug. 20, 2024, 11 pages.
Office Action for U.S. Appl. No. 18/071,985 dated Jan. 11, 2024, 8 pages.
Office Action for U.S. Appl. No. 18/071,985 dated May 8, 2024, 12 pages.
Response to Restriction Requirement for U.S. Appl. No. 18/071,985 dated Feb. 21, 2024, 2 pages.

* cited by examiner

300

400

400

427

METHODS AND SYSTEMS FOR FORMING TRAYS

CROSS-REFERENCE TO RELATED APPLICATION

This application is a continuation-in-part of U.S. patent application Ser. No. 18/071,985, filed on Nov. 30, 2022, which claims the benefit of U.S. Provisional Patent Application No. 63/284,823, filed on Dec. 1, 2021.

INCORPORATION BY REFERENCE

The disclosures of each of U.S. Provisional Patent Application No. 63/284,823, filed on Dec. 1, 2021, U.S. patent application Ser. No. 18/071,985, filed on Nov. 30, 2022, U.S. patent application Ser. No. 17/519,080, filed on Nov. 4, 2021, U.S. patent application Ser. No. 17/519,084, filed on Nov. 4, 2021, U.S. patent application Ser. No. 17/519,092, filed on Nov. 4, 2021, U.S. patent application Ser. No. 17/519,097, filed on Nov. 4, 2021, U.S. patent application Ser. No. 17/519,107, filed on Nov. 4, 2021, U.S. Design patent application Ser. No. 29/785,893, filed on May 27, 2021, U.S. Design patent application Ser. No. 29/785,899, filed on May 27, 2021, U.S. Design patent application Ser. No. 29/785,895, filed on May 27, 2021, U.S. Design patent application Ser. No. 29/785,896, filed on May 27, 2021, U.S. Design patent application Ser. No. 29/785,900, filed on May 27, 2021, U.S. Design patent application Ser. No. 29/785,905, filed on May 27, 2021, and U.S. Design patent application Ser. No. 29/785,902, filed on May 27, 2021, are hereby incorporated by reference for all purposes as if presented herein in their entirety.

BACKGROUND OF THE DISCLOSURE

The present disclosure generally relates to systems and methods of preparing or processing blanks for forming containers, trays, and/or other suitable constructs.

SUMMARY OF THE DISCLOSURE

According to one aspect, the disclosure is generally directed to a method of forming a tray, the method comprising obtaining a blank, the blank comprising a plurality of panels and a plurality of end flaps foldably connected to a respective panel of the plurality of panels, and positioning the blank in a blank feeder assembly of a system for forming a tray. The method further comprises moving the blank to a tray forming assembly, the tray forming assembly comprising a tray forming assembly, the tray forming assembly comprising a turret assembly comprising a plurality of female tray forming members, the tray forming assembly further comprising a piston assembly comprising a male forming member, positioning the blank between the turret assembly and the piston assembly, and moving the piston assembly into at least partial engagement with the turret assembly to form a tray from the blank.

According to another aspect, a system for forming a tray comprises an upstream end, a downstream end, a blank feeder assembly positioned at an upstream end of the system, the blank feeder assembly comprising a blank infeed configured to receive at least one blank for forming a tray, the blank feeder assembly comprising a blank distribution mechanism configured to engage and move the at least one blank in a machine direction of the system, and a tray forming assembly positioned downstream from the blank feeder assembly, the tray forming assembly comprising a turret assembly comprising a plurality of female tray forming members, the tray forming assembly further comprising a piston assembly comprising a male forming member for being at least partially received in a respective female tray forming member of the plurality of female tray forming members for forming a tray from the at least one blank.

According to another aspect, the disclosure is generally directed to a tray forming assembly comprising a turret assembly comprising a plurality of female tray forming members and a piston assembly comprising a male forming member for being at least partially received in a respective female tray forming member of the plurality of female tray forming members for forming a tray from at least one blank.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to a system and method of preparing/processing a blank or other construct for further processing and/or for forming trays, cartons, containers, or other constructs for holding products such as food products, e.g., fruit or vegetable items. In one embodiment, articles described herein can be fruits such as tomatoes (e.g., cherry tomatoes, etc.), berries (e.g., blueberries, raspberries, blackberries, strawberries, etc.), apples, oranges, tangerines, elementines, lemons, limes, cherries, etc. In another embodiment, articles described herein can be product packages, containers, bottles, cans, etc., that are at least partially disposed within the tray embodiments. The articles can be used for packaging food and beverage products, for example.

Figure 1:
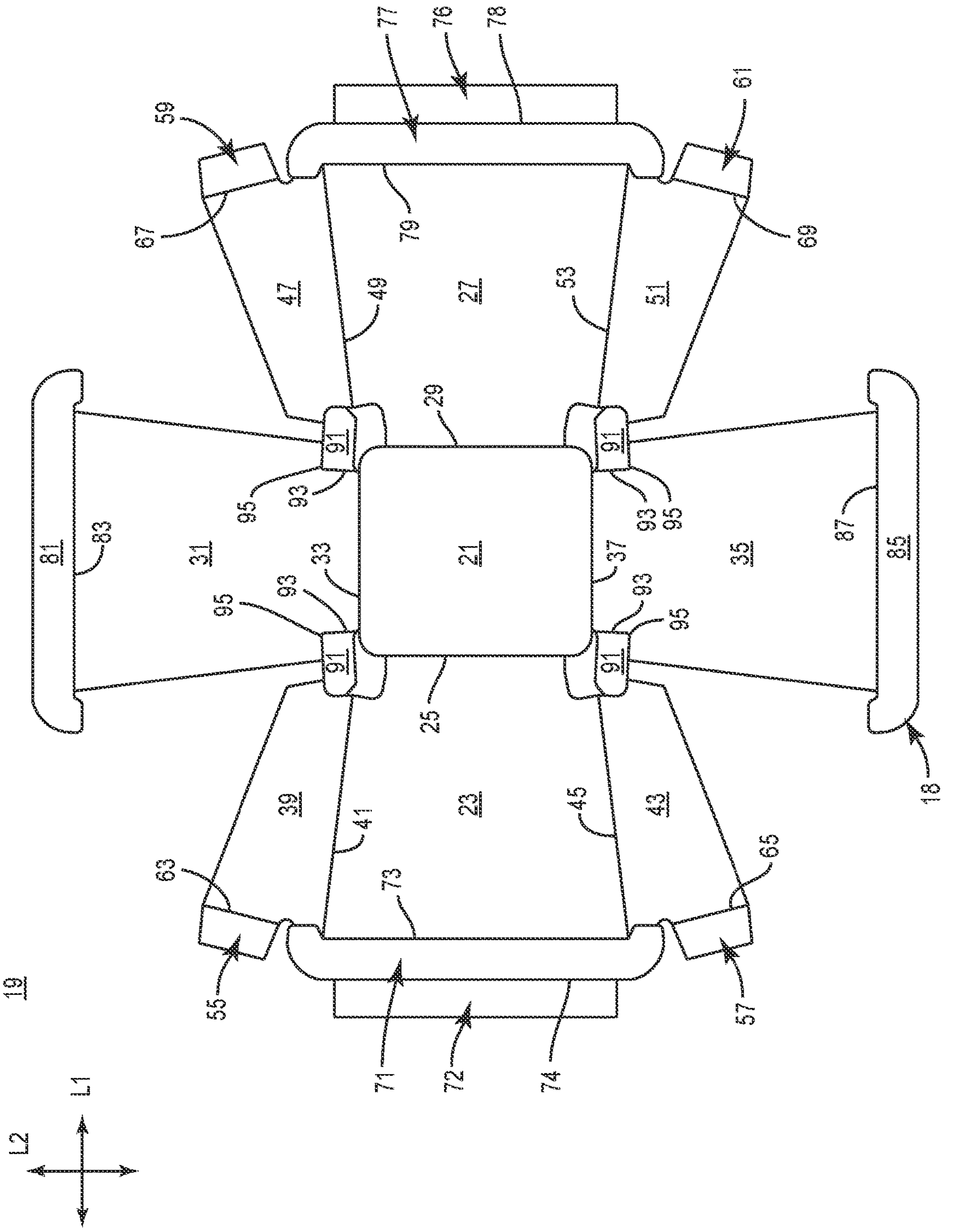
FIG. 1 is a plan view of an exterior surface of a blank for use with systems according to the present disclosure.

FIG. 1 is a plan view of a plan view of an exterior surface 18 of a blank, generally indicated at 19, used to form a container assembly or tray 20 (FIG. 2) according to embodiments of the disclosure. In embodiments, the trays 105 described herein can have a generally square/rectangular tapered configuration with a flanged rim. It will be understood that the trays described herein can have a different configuration without departing from the disclosure, such as a carton or other construct.

As shown, the blank 19 has a longitudinal axis L1 and a lateral axis L2 and includes a plurality of panels including a bottom panel 21, a front panel 23 foldably connected to the bottom panel 21 at a lateral fold line 25, a back panel 27 foldably connected to the bottom panel 21 at a lateral fold line 29, a first side panel 31 foldably connected to the bottom panel 21 at a longitudinal fold line 33, and a second side panel 35 foldably connected to the bottom panel 21 at a longitudinal fold line 37.

The plurality of panels of the blank 19 can also include a plurality of end flaps foldably connected to respective panels of the plurality of panels of the blank 19. In the illustrated embodiment, the end flaps can include a side end flap 39 foldably connected to the front panel 23 at an oblique fold line 41 and a side end flap 43 foldably connected to the front panel 23 at an oblique fold line 45. Similarly, a side end flap 47 can be foldably connected to the back panel 27 at an oblique fold line 49, and a side end flap 51 can be foldably connected to the back panel 27 at an oblique fold line 53.

Respective reinforcement tabs 55, 57, 59, 61 can be foldably connected to the respective side end flaps 39, 43, 47, 51 at respective oblique fold lines 63, 65, 67, 69. As described further herein, the reinforcement tabs 55, 57, 59, 61 can be positioned to engage one or more of the engagement features of the tray 20 formed from the blank 19.

With continued reference to FIG. 1, the end flaps can further include a front top end flap 71 foldably connected to the front panel 23 at a lateral fold line 73, and, similarly, a back top end flap 77 can be foldably connected to the back panel 27 at a lateral fold line 79.

A plurality of reinforcement flaps can also be foldably connected to a respective panel of the plurality of panels of the blank 19 and the tray 20 formed therefrom. In the illustrated embodiment, a front reinforcement flap 72 can be foldably connected to a portion of the front top end flap 71 at a lateral fold line 74, and a back reinforcement flap 76 can be foldably connected to a portion of the back top end flap 77 at a lateral fold line 78. While the reinforcement flaps 72, 76 are illustrated as having a generally rectangular arrangement foldably connected to a central portion of the respective top end flaps 71, 77, it will be understood that one or both of the reinforcement flaps 72, 76 can have a different configuration and/or arrangement without departing from the disclosure. As described further herein, the arrangement of the front reinforcement flap 72 and the back reinforcement flap 76 relative to the respective top end flaps 71, 77 is such to provide additional stiffness/rigidity to one or more portions of the tray 20 upon the formation thereof.

Still referring to FIG. 1, a first side top end flap 81 can be foldably connected to the first side panel 31 at a longitudinal fold line 83, and a second side top end flap 85 can be foldably connected to the second side panel 35 at a longitudinal fold line 87.

As shown, spacing/separating/denesting features of the blank 19/tray 20 can include a plurality of denesting tabs or denesting tabs 91 (broadly, "first denesting tab", "second denesting tab") extending from the respective panels 31, 35 and for being positioned in the interior of the tray 20 formed from the blank 19. In the illustrated arrangement, a pair of denesting tabs 91 can be foldably connected to the first side panel 31 at a respective pair of oblique fold lines 93, and a pair of denesting tabs 91 can be foldably connected to the second side panel 35 at a respective pair of the oblique fold lines 93.

Each denesting tab 91 can be at least partially formed by a respective cut 95 in the respective panels 31, 35 intersecting respective endpoints of the respective fold lines 93 and respective portions of the side end flaps 39, 43, 47, 51. It will be understood that one or more of the tabs 91, fold lines 93, and/or cuts 95 can have a different arrangement without departing from the disclosure.

In this regard, and as described further herein, the denesting tabs 91 are foldably movable away from the respective side panels 31, 35 to extend into the interior of the tray 20 when the tray 20 is formed from the blank 19.

It will be understood that a blank and tray formed therefrom can have a different number, arrangement, and/or configuration of features without departing from the disclosure.

FIGS. 2-11 generally illustrate a first exemplary embodiment of a system 100 for preparing/processing blanks 19, and portions thereof, in accordance with an exemplary embodiment of the present disclosure. As described herein, the system 100 can be configured to fold the panels/flaps of the blank 19 to form the tray 20 having a rim 22.

The blanks 19 can move through the system 100 from an upstream end 103 to a downstream end 105 thereof generally in a first machine direction M1 and a second machine direction M2. In the illustrated embodiment, the machine direction M1 and the machine direction M2 can be generally perpendicular to each other, though the system 100 can have a different arrangement without departing from the disclosure. For example, in one embodiment, the system 100 can be configured in a straight line arrangement such that the upstream end 103 and the downstream end 105 are generally aligned along a single direction.

It will be understood that the components of the system 100 described herein can be supported on one or more frames, e.g., platforms, legs, struts, bars, platforms, casters, connecting portions thereof, etc.

Figure 2:
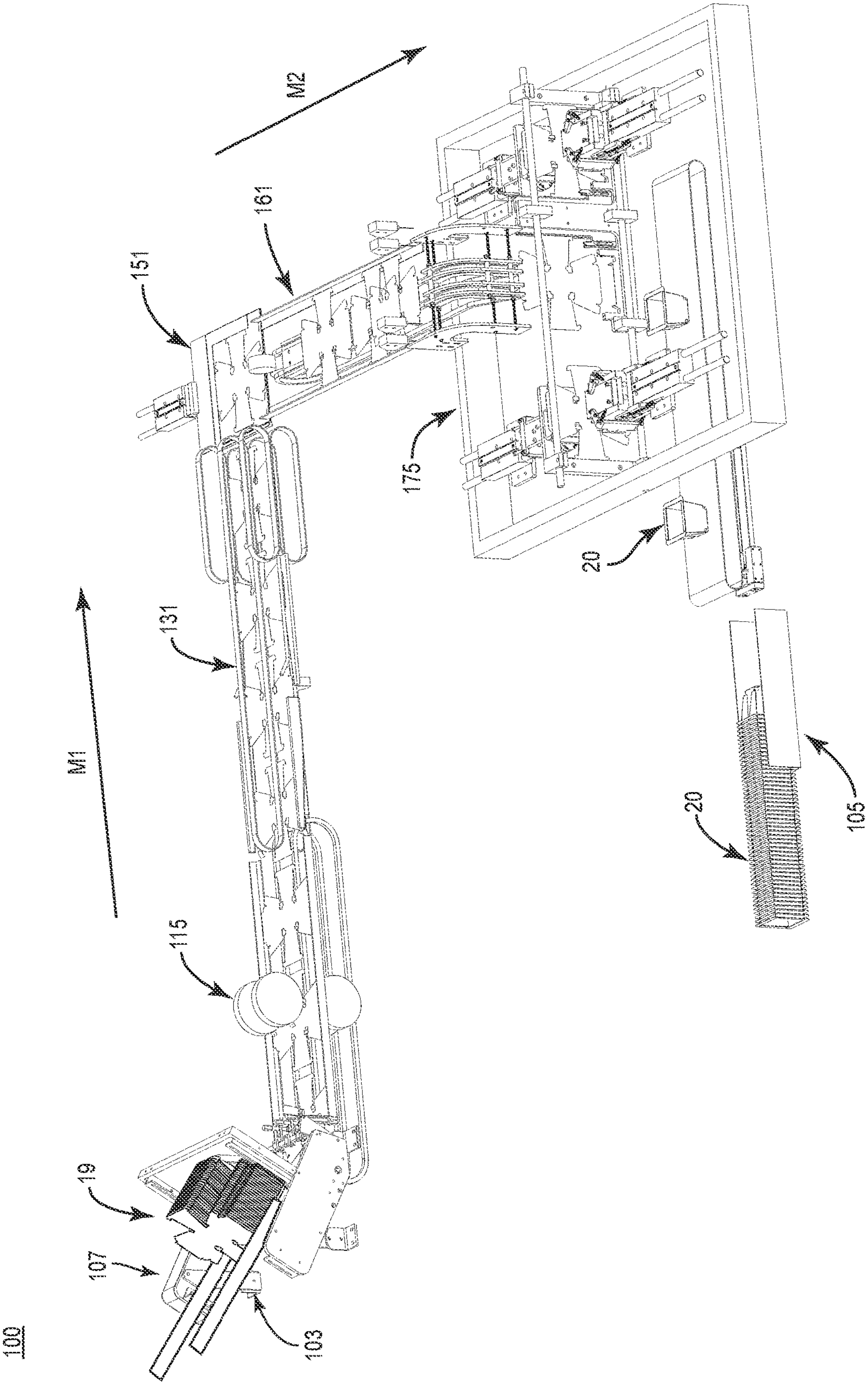
FIG. 2 is a perspective view of a system and method for preparing blanks for forming trays according to a first exemplary embodiment of the disclosure.
Figure 3:
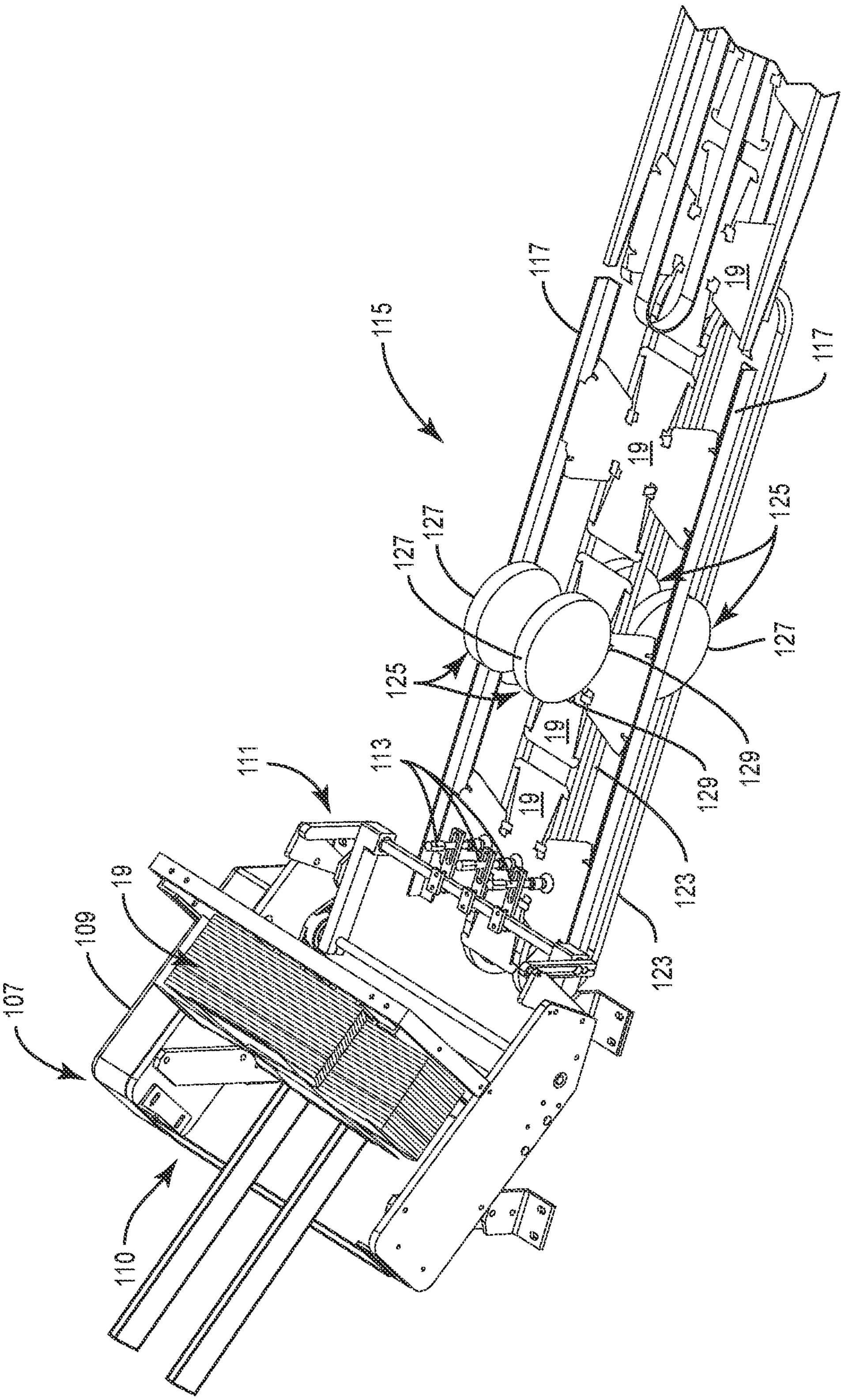
FIG. 3 is an enlarged perspective view of a blank feeder assembly and denicking assembly of the system of FIG. 2.

With reference to FIG. 2, the system 100 can include a blank feeder assembly 107 proximate the upstream end 103 thereof for receiving and sequentially distributing blanks 19 in the machine direction M1 of the system 100. As shown in FIG. 3, the blank feeder assembly 107 can include a housing/base 109 that supports a blank infeed 110 for receiving one or more of the blanks 19. As shown, the blank infeed 110 can have a chute or hopper-like configuration for receiving blanks 19 in a stacked configuration.

As shown in FIG. 3, a blank distribution mechanism 111 can be positioned in communication with a bottom or exit end of the blank infeed 110. The distribution mechanism 111 can be configured to engage and move one or more of the blanks 19 from the blank infeed 110 in the machine direction M1 of the system 100. In this regard, the distribution mechanism 111 can include a rotatable wheel, shuttle, movable plate, etc. operatively coupled with an actuator such as a drive shaft, piston, linkage, etc. In one embodiment, the blank distribution mechanism 111 can include one or more suction arms mounted 113 on an actuator for engaging one or more blanks 19 via a vacuum or suction seal and moving the blanks 19 to a desired location, e.g., a pick-and-place mechanism.

As shown, the blank distribution mechanism 111 can be positioned to place/deposit blanks 19 sequentially onto a nick breaking assembly or denicking assembly 115. The denicking assembly 115 can include a pair of parallel and spaced apart guide rails 117 extending generally in the machine direction M1 for supporting portions of the blanks 19. The guide rails 117, in one embodiment, can have a generally right angle or L-shaped configuration, through the guide rails 117 could have a different configuration without departing from the disclosure.

The denicking assembly 115 can also include a pair of parallel and spaced apart blank engaging members 123 positioned between the guide rails 117 and arranged in a closed/looped, e.g., elliptical, arrangement. The blank engaging members 123 can having a generally elongate configuration, e.g., bands, belts, plates, rods, etc. It will be understood that one or both of the engaging members 123 can be continuous members, or can be formed of multiple jointed segments. In one embodiment, one or both of the engaging members 123 can be formed of a stretchable material, e.g., an elastomeric material or otherwise elastically deformable and/or resilient material.

As shown, the blanks 19 can be supported on the guide rails 117 and the blank engaging members 123 positioned therebelow. The blank engaging members 123 can be operably coupled to a driving mechanism, e.g., rotational components such as rollers, pulleys, gears, belts, etc. of the system 100. In one embodiment, such rotational components can be directly rotated by a driving member/rotational actuator, e.g., one or more motors, or one or more intermediate mechanical transmissions can be provided between such motor(s) and the rotational actuator(s).

In this regard, and as described further herein, the blank engaging members 123 can be driven to rotate such that respective upper portions thereof supporting the blanks 19 are moved in the machine direction M1 to carry the blanks 19 in the machine direction M1.

The denicking assembly 115 can also include pairs of denicking wheels 125 rotatably mounted therealong, with a first or upper pair of denicking wheels 125 positioned above the blanks 19/blank engaging members 123 and with a second or lower pair of denicking wheels 125 positioned below the blanks 19/blank engaging members 123 such that the denicking wheels 125 are arranged for the blanks 19 to pass therebetween as they advance in the machine direction M1.

Figure 3A:
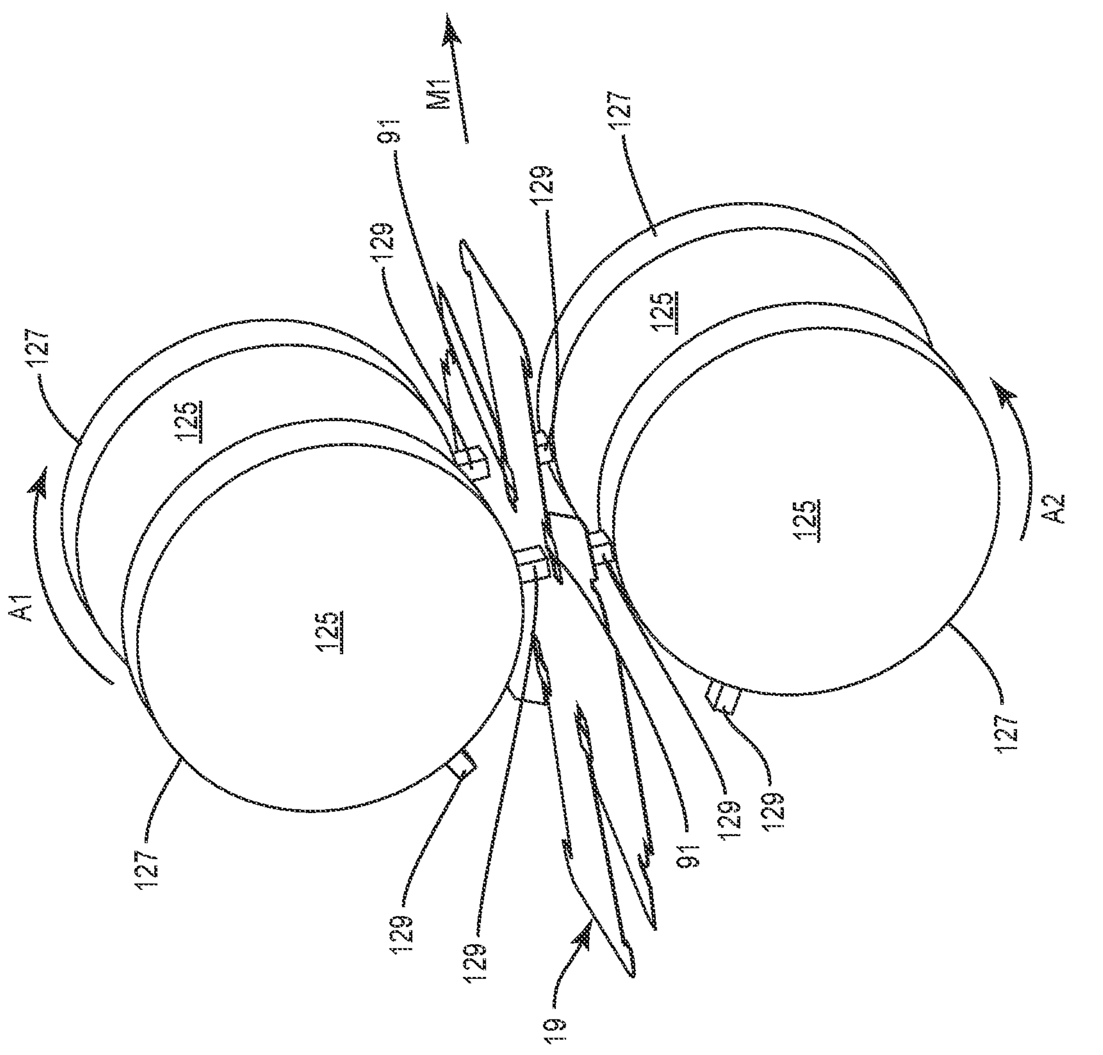
FIG. 3A is an enlarged perspective view of a portion of the denicking assembly of the system of FIG. 2.

Each denicking wheel 125, as shown in FIG. 3A, includes a body or central hub 127 from which a plurality of projections 129 radially extend for engaging portions of the blanks 19. Specifically, and as defined further herein, the denicking wheels 125 are rotatably mounted relative to the blanks 19 such that the projections 129 extending from the upper denicking wheels 125 are positioned to contact the denesting tabs 91 of a given blank 19 and separate them (e.g., by breaking/severing one or more nicks or lines of weakening, for example, along the respective cuts 95) from the remainder of the blank 19 and further fold the denesting tabs 91 downwardly at the respective fold lines 93. Similarly, the lower denicking wheels 125 are mounted such that the projections 129 extending therefrom are positioned to contact the denesting tabs 91 after they have been at least partially folded downwardly by engagement with the upper denicking wheel 125. In this regard, the lower denicking wheel 125 is arranged and configured to further fold the denesting tabs 91 to a desired location relative to the remainder of the blanks 19. The projections 129 extending from a given denicking wheel 125 can thus be circumferentially spaced along the central hub 127 a distance corresponding to a longitudinal distance between denesting tabs 91 along a given blank 19.

The system 100 can include a flap folding assembly 131 positioned downstream from the denicking assembly 115. As shown, the flap folding assembly 131 can include a series of upper blank engaging members 133, 135 positioned above the path of the blanks 19 in the machine direction M1 and a series of lower blank engaging members 133, 135 positioned below the path of the blanks 19 in the machine direction M1. As described above with regard to the blank engaging members 123, the blank engaging members 133, 135 can be provided in a looped, e.g., elliptical, arrangement, and can having a generally elongate configuration, e.g., bands, belts, plates, rods, etc. The blank engaging members 133, 135 can be operably coupled to a driving mechanism, e.g., one or more rotational components such as rollers, pulleys, gears, belts, etc. of the system 100 such that the blank engaging members 133, 135 can be driven to rotate such that respective portions thereof engaging the blanks 19 supported thereon are moved in the machine direction M1. It will be understood that the flap folding assembly 131 can additionally include one or more supporting plates, rails, etc. for supporting the blanks 19.

Figure 4:
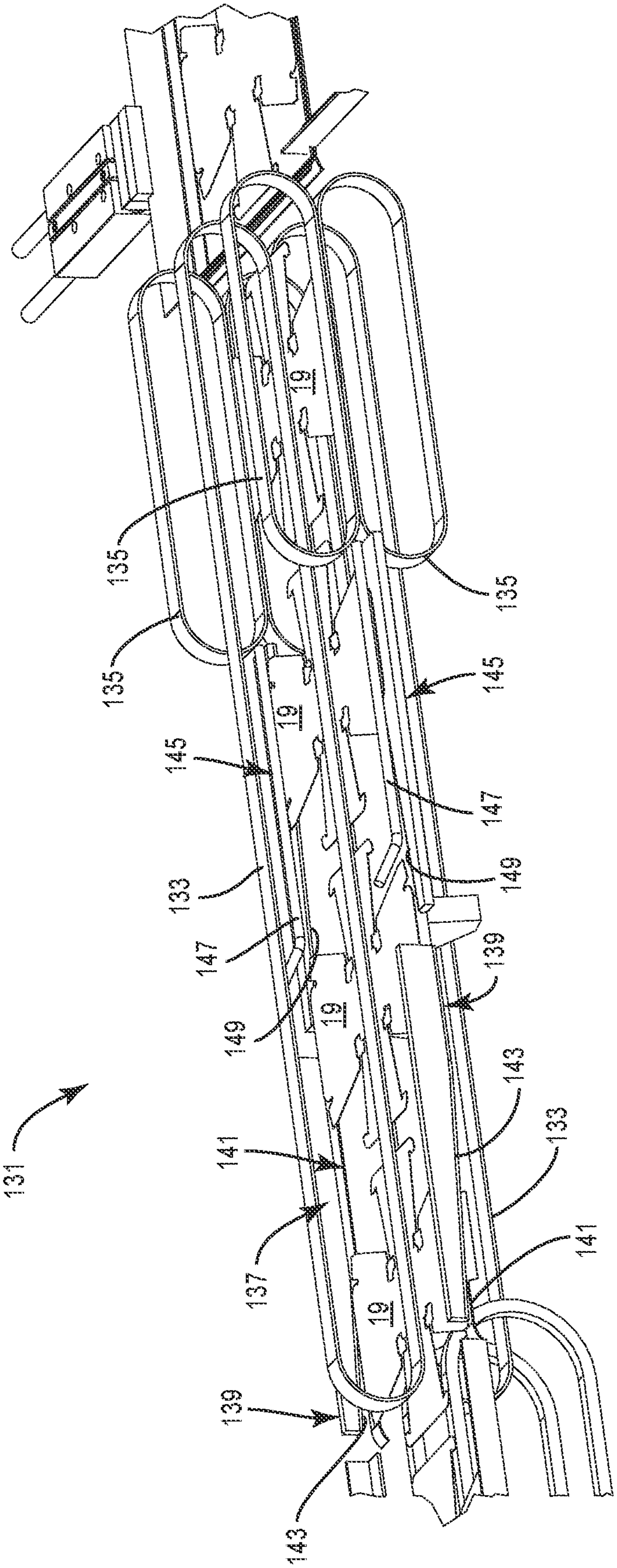
FIG. 4 is an enlarged perspective view of a flap folding assembly of the system of FIG. 2.
Figure 4A:
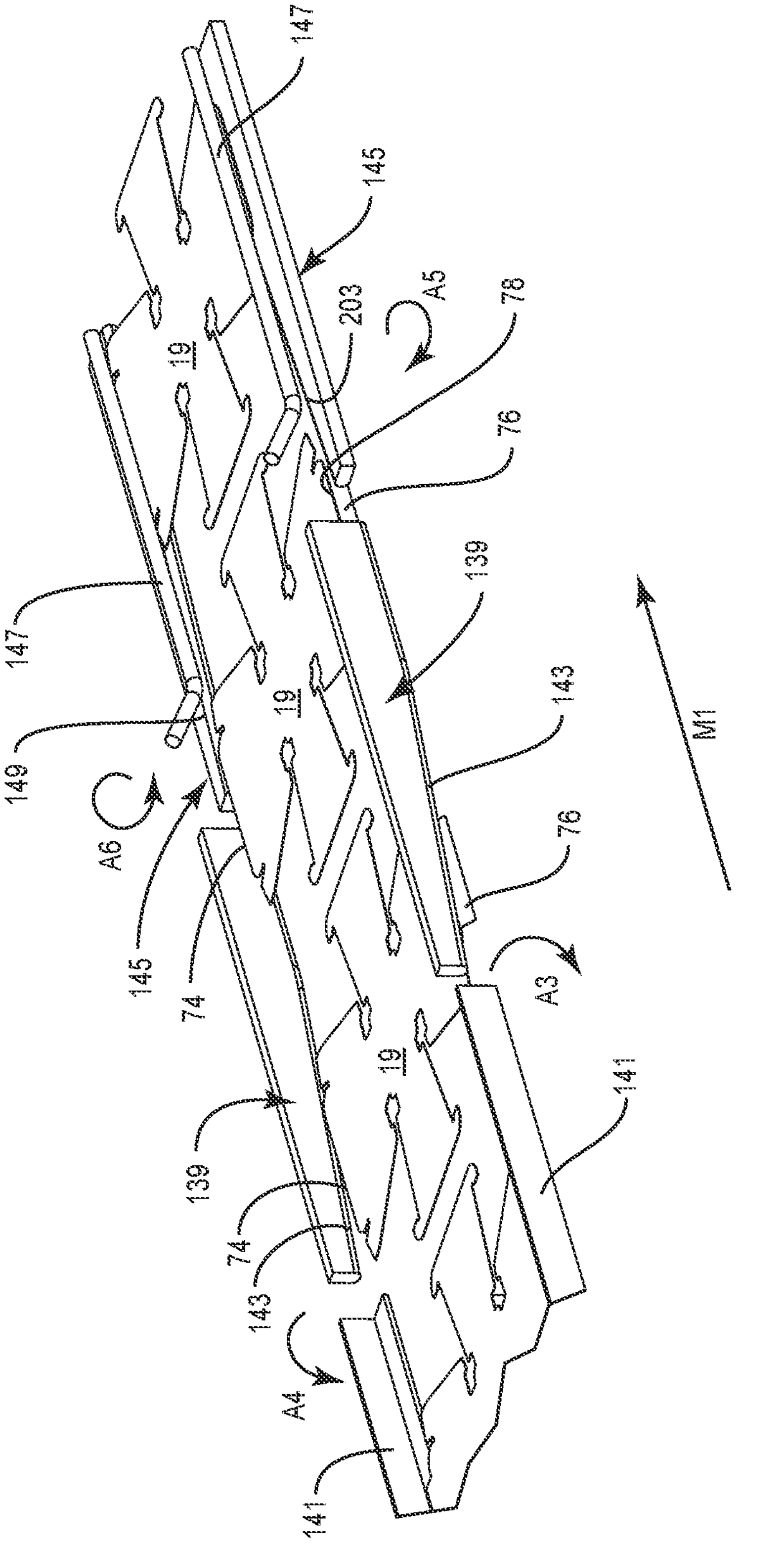
FIG. 4A is an enlarged perspective view of a portion of the flap folding assembly of the system of FIG. 2.

A flap folding apparatus 137 can be positioned along a portion of the flap folding assembly 131, as shown, and can include a pair of spaced apart first flap forming members 139 positioned above respective flap forming sleds 141. As shown in FIGS. 4 and 4A, each of the flap forming members 139 can include a lower sloped surface 143 positioned above a generally flat or plate-like surface of the flap forming sleds 141. The flap forming members 139 can be configured and arranged to cooperate with the forming sleds 141 to at least partially fold the reinforcement flaps 72, 76 at the respective fold lines 74, 78, as described further herein.

The flap folding apparatus 137 can also include a pair of spaced apart second flap forming members 145 positioned downstream of the respective first flap forming members 139 in the machine direction M1, and which are positioned below respective flap forming rails 147. The flap forming members 145 define respective side sloped surfaces 149 that are configured and arranged to cooperate with the respective forming rails 147 to further fold the reinforcement flaps 72, 76 at the respective fold lines 74, 78 and into at least partial face to-face contact with the respective top end flaps 71, 77, as described further herein.

With continued reference to FIGS. 2-11, a blank transfer assembly 151 can be positioned downstream from the flap folding assembly 131 in the machine direction M1, and can be configured to advance the blanks 19 in the machine direction M2 toward further downstream components of the system 100.

As shown, the blank transfer assembly 151 can include a pair of transfer plates 153 or other supports between which blanks 19 are sequentially deposited from the exit of the flap folding assembly 131 in the machine direction M1, and from which such blanks 19 can be advanced in the machine direction M2 upon action of a blank pusher assembly 155. The blank pusher assembly 155 can include an actuator 156, e.g., a hydraulic or pneumatic actuator, operably coupled to drive one or more piston arms 158 along the machine direction M2.

In this regard, the transfer plates 153 can be at least partially spaced apart, for example, by a thickness of a single blank 19 (or, in the illustrated embodiment, generally twice the thickness of a single blank 19 to accommodate the reinforcement flaps 72, 76 overlapped with the respective top end flaps 71, 77) as it exits the flap folding assembly 131. In one embodiment, the transfer plates 153 can have free edges that are bent/angled away from one another so as to create a funnel or intake portion for facilitating receipt of a leading edge of a blank 19. It will be understood that the portion of the blank transfer assembly 151 that receives blanks 19 exiting the flap folding assembly 131 can have a different configuration without departing from the disclosure.

A block 160 or other adapter can be coupled to an end of the piston arms 158, and can be attached to a pusher frame 162 for engaging and advancing the blanks 19 between the transfer plates 153. As shown, the pusher frame 162 can be a generally planar member that is slidably positioned between the plates 153 and which has at least one blank engaging edge for contacting an edge of a blank 19 between the plates 153. In the illustrated embodiment, the pusher frame 162 can have a generally perpendicular configuration, with a blank engaging edge 164 for contacting the blank 19 along a free edge parallel to the machine direction M1, and a blank engaging edge 166 for contacting the blank 19 along a free edge parallel to the machine direction M2.

Figure 5:
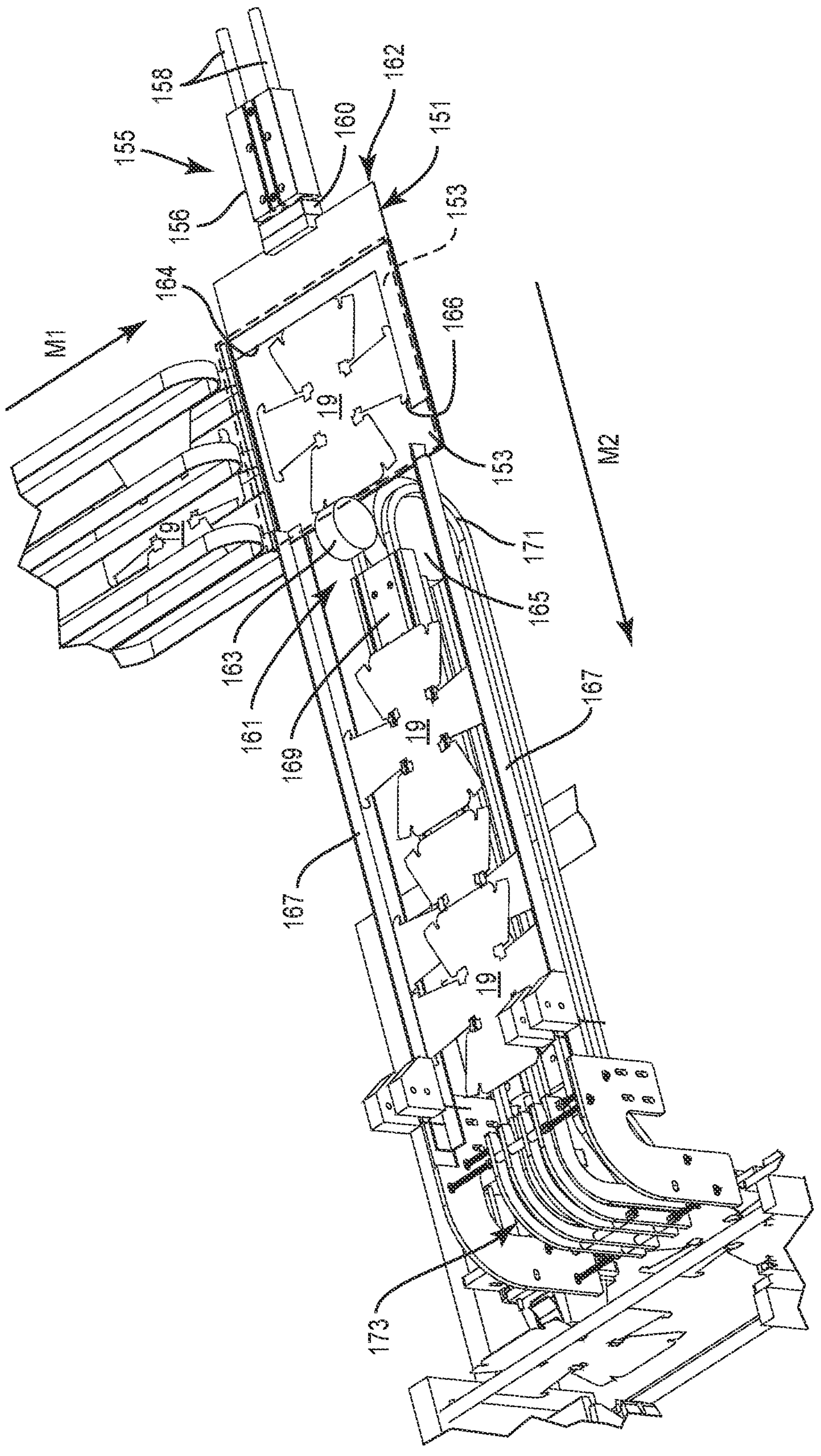
FIG. 5 is an enlarged perspective view of a transfer station and nipping assembly of the system of FIG. 2.

As shown in FIG. 5, a nipping assembly 161 can be provided downstream from the transfer assembly 151 in the machine direction M2. The nipping assembly 161 can include a pair of nipping rollers or nip rollers for applying a nipping, e.g., pressing or laminating operation, to blanks 19 received from the transfer assembly 151. In the illustrated embodiment, the nipping assembly 161 can include an upper nip roller 163 positioned above a lower nip roller 165 such that blanks 19 can be received and at least partially pressed therebetween. In this regard, a desired pressure on blanks 19 positioned between the nip rollers 163, 165 can be achieved through relative positioning of the rollers 163, 165. In one embodiment, one or more actuators can be coupled to one or both of the rollers 163, 165 to provide a desired pressure on the blanks 19.

One or both of the nip rollers 163, 165 can be driven by a motor or other actuator, e.g., either directly or via one or more intermediate mechanical transmissions, to cause rotation of the rollers 163, 165. In the illustrated embodiment, the lower nip roller 165 can be larger than the upper nip roller 163, though a different configuration and arrangement of nip rollers 163, 165 can be provided without departing from the disclosure.

The nipping assembly 161 can include a pair of parallel and spaced apart guide rails 167 extending generally in the machine direction M2 for supporting portions of the blanks 19 adjacent and downstream of the nip rollers 163, 165. In the illustrated embodiment, a bedplate 169 or other supporting surface can be provided between the guide rails 167 to support central portions of the blanks 19. While the guide rails 167 are shown having a generally perpendicular of L-shaped bracket configuration and the bedplate 169 having a generally flat configuration, it will be understood that these components can have a different configuration without departing from the disclosure.

The nipping assembly 161 can also include a pair of parallel and spaced apart blank engaging members 171 running alongside the bedplate 169 between the guide rails 167 and having a configuration similar to the blank engaging members 123, 133, 135 described above, e.g., arranged in a looped/closed arrangement, and having a generally elongate configuration, e.g., bands, belts, plates, rods, etc. In the illustrated embodiment, the blank engaging members 171 can be at least partially looped around a portion of the lower nip roller 165 or an associated structure so as to rotate in concert with the nip roller 165. The blank engaging members 171 can also be disposed along/over a top surface of the bedplate 169 so as to be positioned for engagement with the blanks 19 supported thereon. In one embodiment, the blank engaging members 167 can be at least partially disposed in recessed tracks or channels defined in the bedplate 169.

The blank engaging members 171 can be operably coupled to a driving mechanism, e.g., rotational components such as rollers, pulleys, gears, belts, etc. of the system 100 such that the blank engaging members 171 can be driven to rotate such that respective portions thereof engaging the blanks 19 are moved in the machine direction M2.

A pair of downwardly curved guides 173 can be positioned above a downstream portion of the nipping assembly 161 so as to divert blanks 19 exiting the nipping assembly 161 in a downward direction, e.g., perpendicular to both the machine directions M1 and M2, into a tray forming assembly 175.

Figure 6:
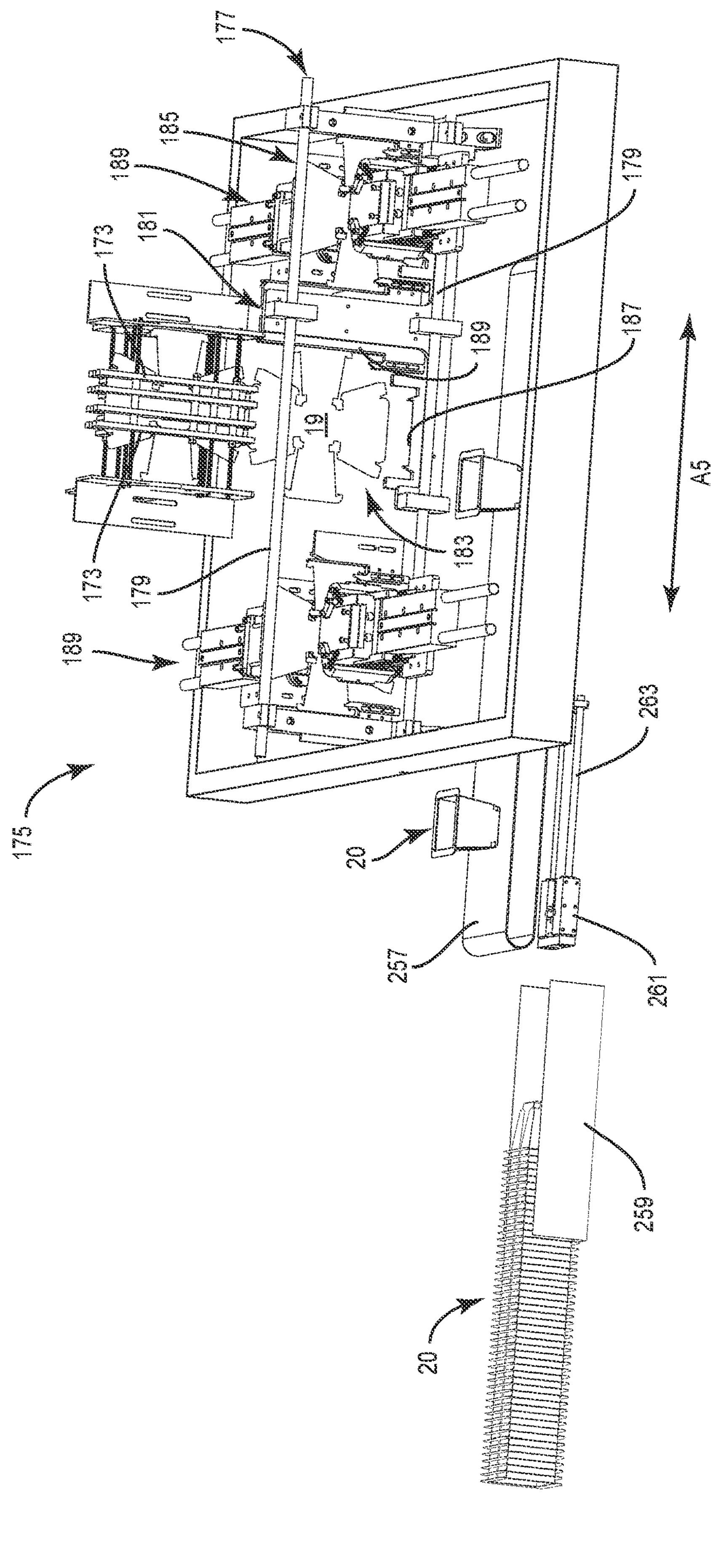
FIG. 6 is an enlarged perspective view of a tray forming assembly of the system of FIG. 2.
Figure 7:
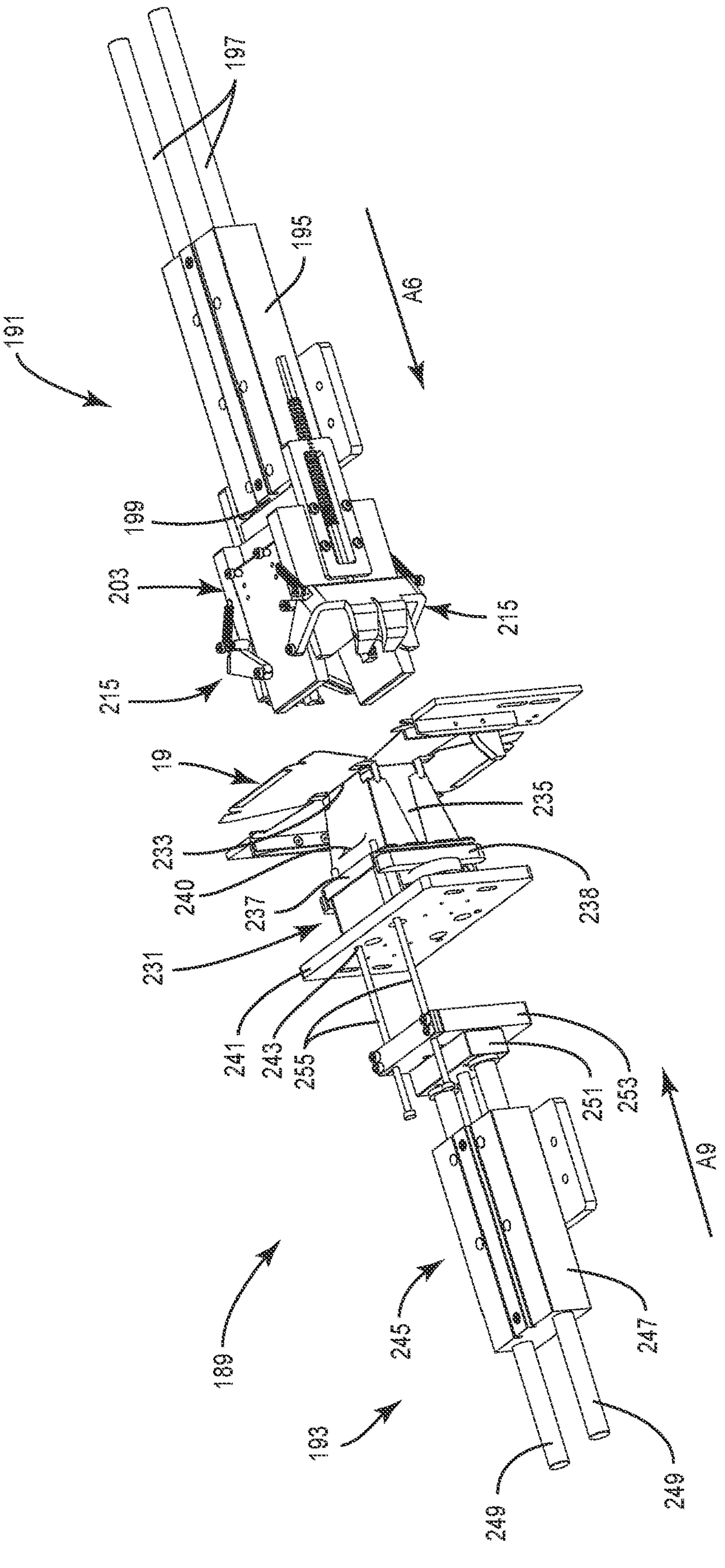
FIG. 7 is an enlarged perspective view of a tray forming apparatus of the tray forming assembly of FIG. 6.
Figure 8:
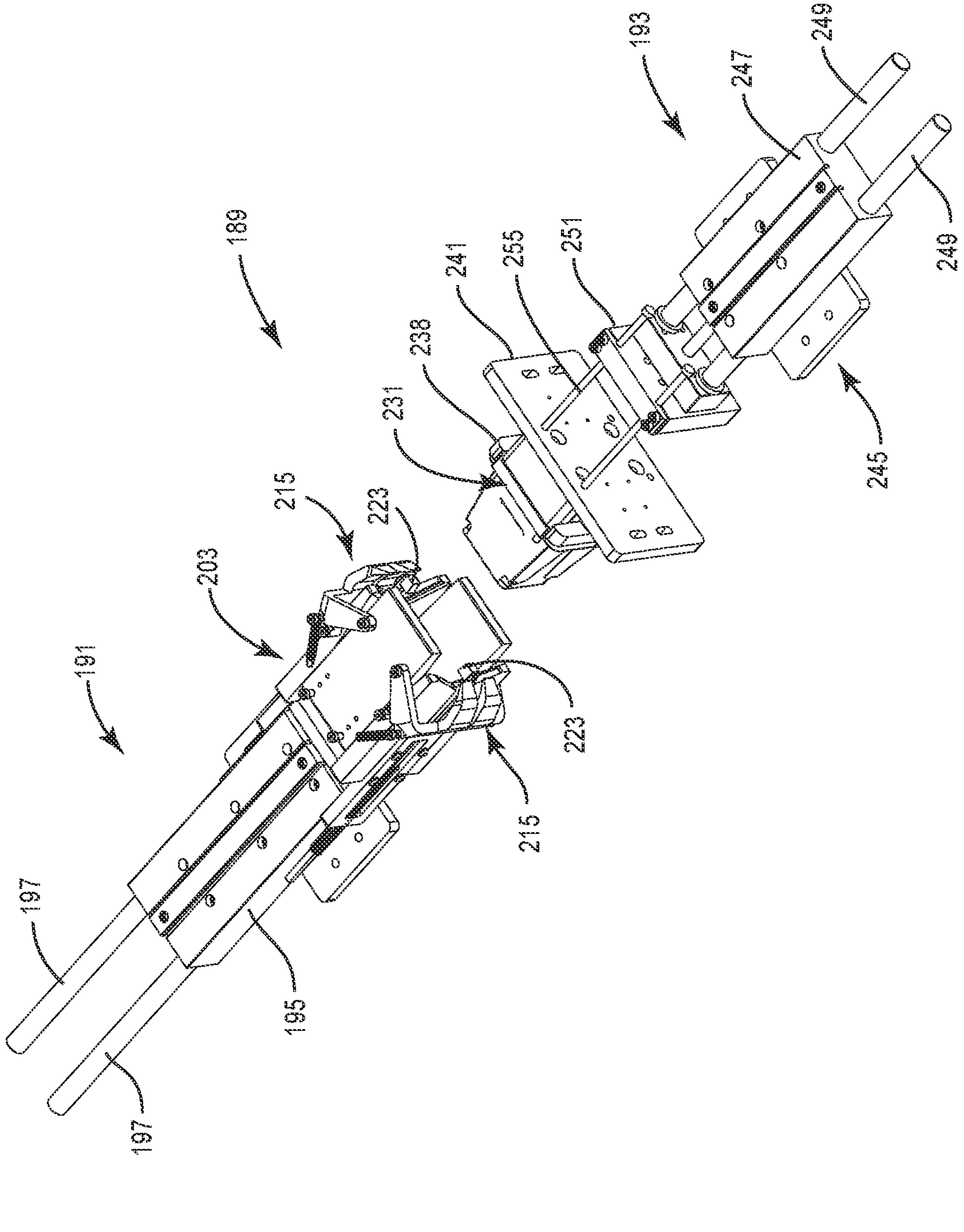
FIG. 8 is another enlarged perspective view of a tray forming apparatus of the tray forming assembly of FIG. 6.

As shown, in FIG. 6, the tray forming assembly 175 can include a shuttle assembly 177 for moving blanks 19 between a pair of tray forming apparatuses 189. As described further herein, the tray forming apparatuses 189 can be operated to form trays 20 from blanks 19 in a staggered or alternating fashion, e.g., such that a tray forming process of one tray forming apparatus 189 ends or nears completion as a tray forming process of the other tray forming apparatus 189 begins.

The shuttle assembly 177 can include a plurality of rails 179 along which a frame 181 is slidably coupled. The frame 181, as shown, includes a first receiving portion 183 for receiving a blank 19 and a second receiving portion 185 for receiving another blank. Each receiving portion 183, 185 can include a lower channel or slot 187 for receiving a lower edge of the blanks 19 received from the nipping assembly 161, and a side channel or slot 189 for receiving a side edge of the blanks 19.

In this regard, and as described further herein, the slidable frame 181 can be moved along the rails 179, e.g., via a pneumatic or hydraulic component or other actuator, to move the first receiving portion 183 of the frame 181 to a position below the guides 173 for receiving a blank 19, and to move the first receiving portion 183 into engagement with a tray forming apparatus 189 (broadly, "first tray forming apparatus").

Similarly, the frame 181 can be actuated such that the receiving portion 185 is moved to a position below the guides 173 for receiving a blank 19, and to move the second receiving portion 185 into engagement with a tray forming apparatus 189 (broadly, "second tray forming apparatus"). As described further herein, the slidable frame 181 can be configured to receive and move a blank 19 into engagement with one of the tray forming apparatuses 189, return to a central position below the guides 173 for receiving another blank 19, and move that blank 19 into engagement with the other tray forming apparatus 189.

With continued reference to FIGS. 1-11, each tray forming apparatus 189 includes a first tray forming portion 191 and a second tray forming portion 193. The first tray forming portion 191 can include an actuator 195, e.g., a pneumatic actuator, driving one or more piston rods 197 therefrom to an actuator head 199 coupled to a forming block 203 such that the actuator 195 is operably coupled with the forming block 203. In this regard, the first tray forming portion 191 is movably arranged relative to the second tray forming portion 193, as described further herein.

Figure 9:
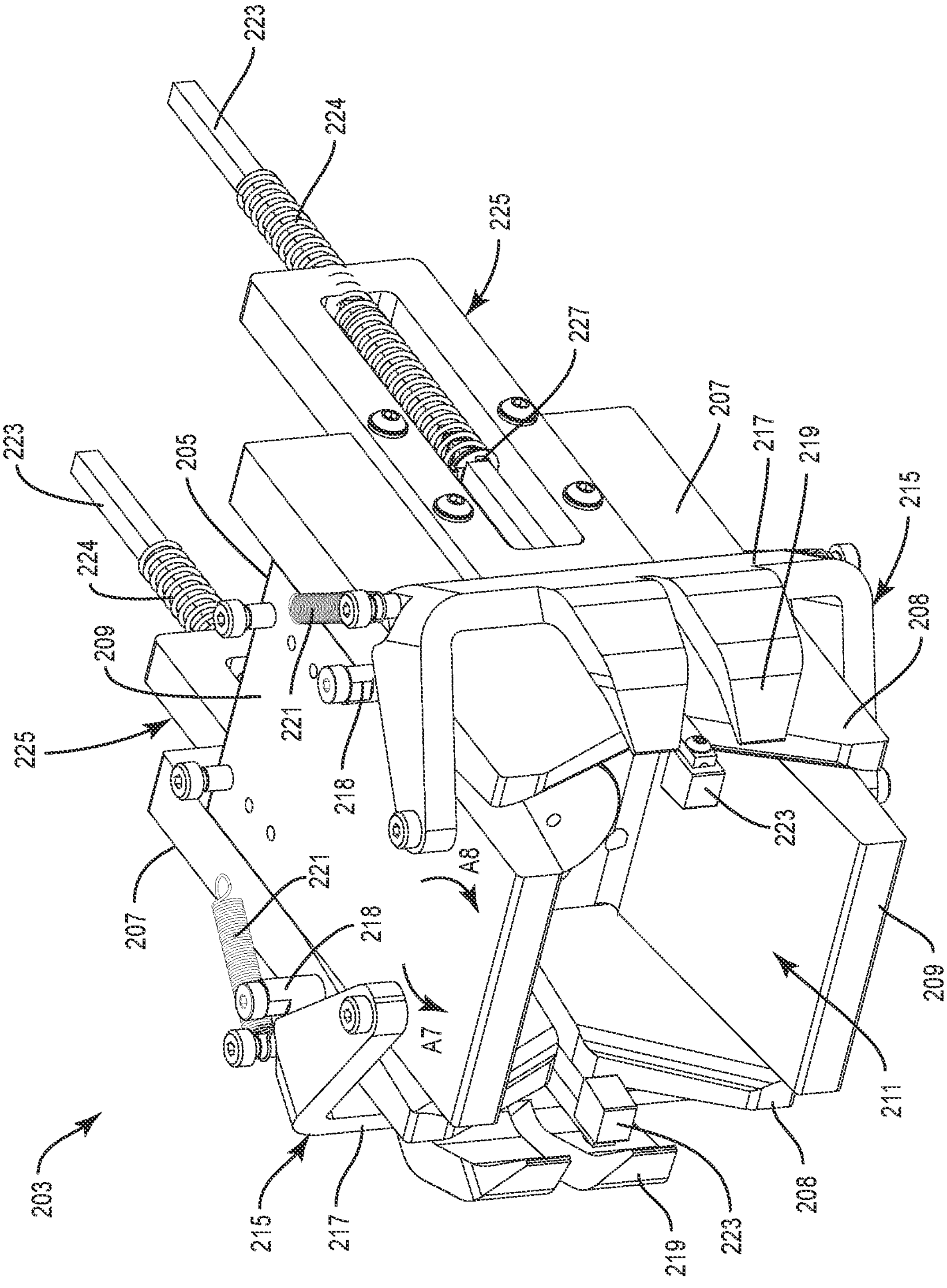
FIG. 9 is an enlarged perspective view of a portion of a tray forming apparatus of the tray forming assembly of FIG. 6.

As shown in FIG. 9, the forming block 203 can have a base portion 205, side portions 207 extending from the base portion 205, and front and back portions 209 extending from the base portion 205 such that the portions 205, 207, 209 form an interior 211 of the forming block 203 for at least partially receiving the blank 19/tray 20. As shown, the forming block 203 can be formed of multiple connected components, e.g., plates. In this regard, one or more of the portions 205, 207, 209 of the forming block 203 can be adjustable relative to the remainder of the forming block 203, e.g., to accommodate blanks 19/trays 20 of different sizes. In one embodiment, the forming block 203 can have a monolithic or unitary construction.

In the illustrated embodiment, the side portions 207 can have end surfaces 208 that are sloped, e.g., surfaces that are at least partially curved or angled, rearwardly toward the base portion 205 so as to define one or more recessed portions along an end of the side portions 207. As also shown, the front portion 209 and the back portion 209 of the forming block 203 can extend away from the base portion 205 and can protrude past the ends of the side portions 207.

As shown, a pair of articulating arms 215 can be pivotably coupled to the respective side portions 207 of the forming block 203, and can include a respective base portion 217 and respective curved finger portions 219 extending from the respective base portions 217. As described further herein, the arms 215 are configured to pivot/articulate relative to the forming block 203 for forming further features of the blanks 19/trays 20, and include tension springs 221 for biasing the arms 215 back to a resting configuration relative to the forming block 203. A pair of articulation lugs 218 can also extend from the respective front portion 209 and back portion 209 of the forming block 203 for actuating the arms 215, as described further herein.

The first tray forming portion 191 of each tray forming apparatus 189 can also include a pair of tray engagement rods 223 slidably disposed through respective mounts 225 coupled to the forming block 203. As described further herein, the engagement rods 223 can be biased forwardly by a coiled spring 224 compressed between an interior edge of the respective mounts 225 and a stop 227 abutting the respective engagement rods 223.

The second tray forming portion 193 of each tray forming apparatus 189 can include a female tray forming member 231 configured and arranged to be at least partially received in the interior 211 of the forming block 203. In the illustrated embodiment, the tray forming member 231 can have a generally tapered rounded trapezoidal configuration, with a bottom portion 233, four side portions 235, and a flanged upper portion 237 extending from one or more of the side portions 235. In some embodiments, apertures can be provided in selected corner regions of the flanged upper portion 237 of the tray forming member 231. In the illustrated embodiment, the flanged upper portion 237 can extend along upper and lower side portions 235 of the tray forming member 231, and a pair of bump members 238 can be provided on the remaining side portions 235 spaced forwardly of the flanged portions 237 such that the bump members 238 also form flanged portions of the tray forming member 231.

As also shown, one or more tray engaging members or mandrels 240 can be attached to respective side portions 235 of the tray forming member 231 and positioned to extend away therefrom. In one embodiment, the mandrel 240 can be an at least partially curved flexible member that is positioned to engage the interior of a formed tray 20, as described further herein.

The tray forming member 231 can be supported on a mount or other support that includes a mounting plate 241 having a plurality of apertures 243 defined therethrough. In some embodiments, the apertures 243 of the mounting plate 241 can be generally aligned with the apertures of the tray forming member 231.

Still referring to FIGS. 1-11, each tray forming apparatus 189 can include or can be configured to cooperate with an ejection assembly 245 for disengaging blanks 19/trays 20 from the tray forming member 231. The ejection assembly 245 can include an actuator 247, e.g., a pneumatic or hydraulic actuator, driving one or more piston rods 249 therefrom to an actuator head 251 coupled to an ejection plate 253 to which a plurality of ejection pins 255 are fixedly coupled. For example, the ejection pins 255 can be attached with one or more fasteners to the ejection plate 253, or can be otherwise attached to the ejection plate 253 so as to extend away from the ejection plate 253. In one embodiment, one or more apertures or recesses can be defined in the ejection plate 253 for at least partially receiving the respective ejection pins 255, and such apertures can be generally aligned with the apertures of the tray forming member 231 and the apertures of the mounting plate 241.

As shown, the ejection pins 255 extending from the ejection plate 253 can be positioned to extend through the apertures of the tray forming member 231 and the apertures of the mounting plate 241 such that, upon actuation of the actuator 247, the ejection plate 253 can be driven toward the tray forming member 231 such that free ends of the ejection pins 255 can extend through the apertures 243 to disengage a blank 19/tray 20 from the tray forming member 231.

The system 100 can be provided with a conveyor assembly positioned below the tray forming apparatuses 189 to receive and move trays 20 formed from the blanks 19. In this regard, the conveyor assembly can include a conveyor belt 257 or other member at least partially extending around a rotational actuator, e.g., a motor or other actuator, either directly or via one or more intermediate mechanical transmissions, such that upon activation the conveyor belt 257 can move trays 20 in a desired direction.

In one embodiment, the conveyor belt 257 can deposit trays 20 in a chute 259 or other receiving structure. As shown, the trays 20 can be deposited on their sides such that adjacent trays 20 are positioned for a nesting arrangement. In this regard, an actuator 261, e.g., a pneumatic actuator, driving one or more piston rods 263 therefrom to contact (directly or indirectly) an outermost tray 20 of a series of trays 20 in the chutes 259 such that the piston rods 263 can be advanced to nest/stack the trays 20 in the chute 259, for example, for storage, shipping, etc.

With continued reference to FIGS. 1-11, formation of one or more trays 20 from respective blanks 19 with the system 100 will be described according to an exemplary embodiment of the disclosure. As described herein, activation or actuation of one or more components of the system can include energizing motors, either directly driving a component or via one or more mechanical transmissions, driving/activating other pneumatic/hydraulic or other actuators, engaging one or more other components, etc.

One or more of the blanks 19 can be obtained and loaded into the blank feeder assembly 107. In the illustrated embodiment, the blanks 19 can be positioned with the lateral axis L2 arranged vertically in the blank infeed 110, e.g., such that either the front reinforcement flap 72 or the back reinforcement flap 76 is positioned as the lowermost element of the blank 19 in the blank infeed 110, and with the exterior surface 18 of the blank 19 generally facing in the machine direction M1.

As shown, a series of blanks 19 that include at least a first blank 19 succeeded by a second blank 19 can be moved through the system 100. For clarity of description, the following processes will generally be described with respect to a single blank 19, but it will be understood that such process can be repeated in series for each succeeding blank 19 moving through the system 100.

The blank distribution mechanism 111 can be activated such that one or more of the suction arms 113 sealably engages the blank 19 and exerts a vacuum pressure thereon such that the suction arms 113 and the blank 19 carried thereon can be moved/pivoted, etc. toward the denicking assembly 115 in the machine direction M1.

The blank 19 can be positioned with the exterior surface 18 facing upwardly on the denicking assembly 115, supported by the guide rails 117 and with the blank engaging members 123 extending underneath the blank. Activation of one or more gears, rollers, etc. about which the blank engaging members 123 extend can cause the blank engaging members 123 to frictionally engage the underside of the blank 19 and carry the blank 19 in the machine direction M1.

The denicking wheels 125 can be driven such that, as the blank 19 approaches and moves between the upper denicking wheels 125 and the lower denicking wheels 125, the upper denicking wheels 125 rotate in a clockwise direction (from the perspective of FIG. 3A) in the direction of the arrow A1 and such that the lower denicking wheels 125 rotate in a counterclockwise direction (from the perspective of FIG. 3A) in the direction of the arrow A2. Accordingly, the projections 129 of the upper denicking wheels 125 can approach and contact the denesting tabs 91 of the blank 19 to at least partially separate them from the surrounding portions of the blank 19. In one embodiment, contact with the blank 19 by the projections 129 of the upper denicking wheel 125 can cause the denesting tabs 91 to at least partially fold downwardly at the respective fold lines 93 and away from the respective panels 21, 23, 27, 31, 35.

Following engagement of the denesting tabs 91 of the blank 19 with the projections 129 of the upper denicking wheel 125, the projections 129 of the lower denicking wheel 125 can further engage the deflected denesting tabs 91 to cause them to further fold at the respective fold lines 93 to a desired arrangement with respect to the remainder of the blank 19, e.g., obliquely or orthogonally extending away from the remainder of the blank 19. In this regard, the upper denicking wheel 125 and the lower denicking wheel 125 can be rotatably mounted and driven in a manner such that the projections 129 of the upper denicking wheel 125 engage the denesting tabs 91 of the blank 19 prior to the projections 129 of the lower denicking wheel 125.

As the blank 19 is further advanced downstream in the machine direction M1, the blank 19 can be moved to and between the upper blank engaging members 133, 135 and the lower blank engaging members 133, 135 of the flap folding assembly 131. Activation of one or more gears, rollers, etc. about which the blank engaging members 133, 135 extend can cause the blank engaging members 133, 135 to frictionally engage the blank 19 and carry the blank 19 through the flap folding assembly 131.

As shown best in FIG. 4A, as the blank 19 approaches the flap folding apparatus 137, the blank 19 can be supported on the flap forming sleds 141 and the reinforcement flaps 72, 76 can contact the respective lower sloped surface 143 of the respective flap forming members 139. As the blank 19 continues downstream, the lower sloped surfaces 143 can cause the reinforcement flaps 72, 76 to fold downwardly at the respective fold lines 74, 78 in the direction of the respective arrows A3, A4. In one embodiment, the fold lines 74, 78 can be generally aligned with an edge of the respective flap forming sleds 141 to facilitate such folding.

Further downstream movement of the blank 19 through the flap folding apparatus 137 results in the downwardly-folded reinforcement flaps 72, 76 contacting the respective side sloped surfaces 149 of the respective flap forming members 145 to cause further folding of the reinforcement flaps 72, 76 at the respective fold lines 74, 78 in the direction of the respective arrows A5, A6 toward the respective top end flaps 71, 77. Positioning of the respective forming rails 147 above the respective forming members 145 can facilitate folding of the reinforcement flaps 72, 76 into at least partial face-to-face contact with the respective top end flaps 71, 77 therebetween.

Following folding of the reinforcement flaps 72, 76 as described above, the blank 19 can be moved to and between the transfer plates 153 of the blank transfer assembly 151 in the machine direction M1, e.g., such that the lateral axis L2 of the blank 19 is arranged along the machine direction M1 and such that the longitudinal axis L1 of the blank 19 is arranged along the machine direction M2.

Once the blank 19 is positioned within the blank transfer assembly 151, the actuator 156 of the blank pusher assembly 155 can be activated to cause the piston rods 158 to push the block 160 and the pusher frame 162 coupled thereto in the machine direction M2. Accordingly, the blank engaging edges 164, 166 of the pusher frame 162 can engage and advance the blank 19 toward an exit of the transfer plates 153 in the machine direction M2 and into engagement between the nip rollers 163, 165 of the nipping assembly 161.

Outside edge portions of the blank 19 (e.g., proximate the top end flaps 81, 85) can be supported on the respective guide rails 167 and one or both of the nip rollers 163, 165 can be activated/driven to cause the blank 19 to be pressed therebetween. Specifically, the nip rollers 163, 165 can be arranged to further press the reinforcement flaps 72, 76 into at least partial face-to-face contact with the respective top end flaps 71, 77 to reinforce/seal/secure the flap folding operation performed by the flap folding assembly 131 as described above. In the illustrated embodiment, the upper nip roller 163 can be rotated in a clockwise direction (from the perspective of FIG. 5) and the lower nip roller 165 can be rotated in a counterclockwise direction (from the perspective of FIG. 5).

As the blank 19 advances forwardly in the machine direction M2, the blank engaging members 171 can be driven to carry the blank 19 downstream along the bedplate 169 and guide rails 167 toward a downstream portion of the nipping assembly 161. As the blank 19 reaches the downstream end of the blank engaging members 171, so as to be advanced off the bedplate 169/blank engaging members 171, the curved guides 173 can engage the blank 19 and direct it downwardly under the influence of gravity into the tray forming assembly 175 further downstream in the machine direction M2.

As shown in FIGS. 5 and 6, the blank 19 can move adjacent the curved guides 173 into a generally vertical/upright arrangement such that a lower edge thereof falls into a slot 187 of a respective receiving portion 183, 185 of the frame 181 of the shuttle assembly 177. In this regard, the blank 19 can be at least partially received and supported in the vertical/upright arrangement in the frame 181.

Upon receiving a blank 19, the shuttle assembly 177 can be actuated, e.g., via activation of one or more actuators, and moved such that the frame 181 slides along the rails 179, to position the blank 19 between the first tray forming portion 191 and the second tray forming portion 193 of a respective tray forming apparatus 189. In particular, the blank 19 can be positioned such that the bottom panel 21 of the blank 19 is positioned facing the bottom portion 233 of the tray forming member 231. In the illustrated embodiment, the frame 181 can be reciprocated along the rails 179 in the directions indicated by the bidirectional arrow A5 to achieve such selective positioning of the blank 19 relative to the tray forming apparatuses 189.

Figure 10:
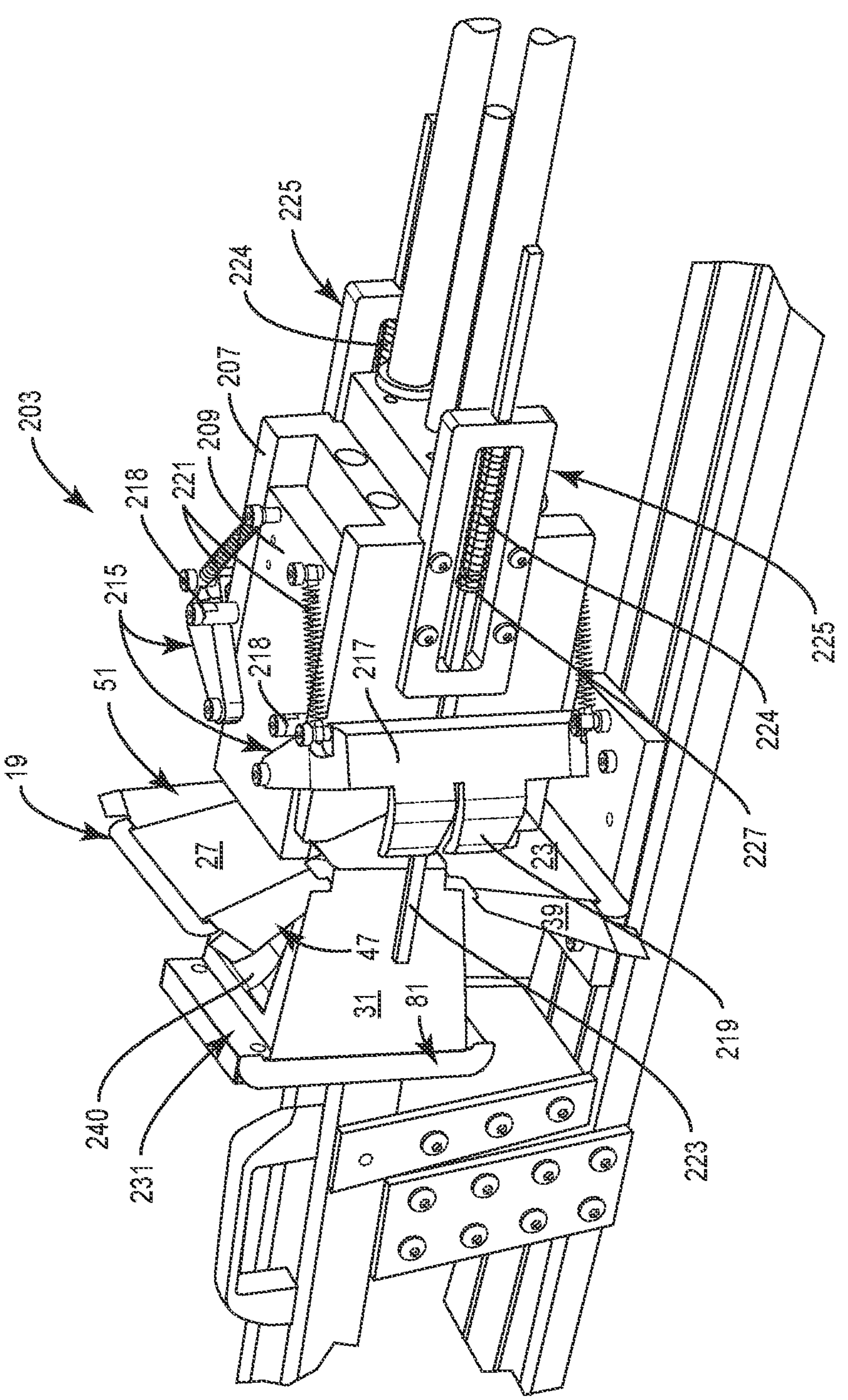
FIGS. 10 and 11 are sequential perspective views of an operation of a tray forming apparatus of the tray forming assembly of FIG. 6.
Figure 11:
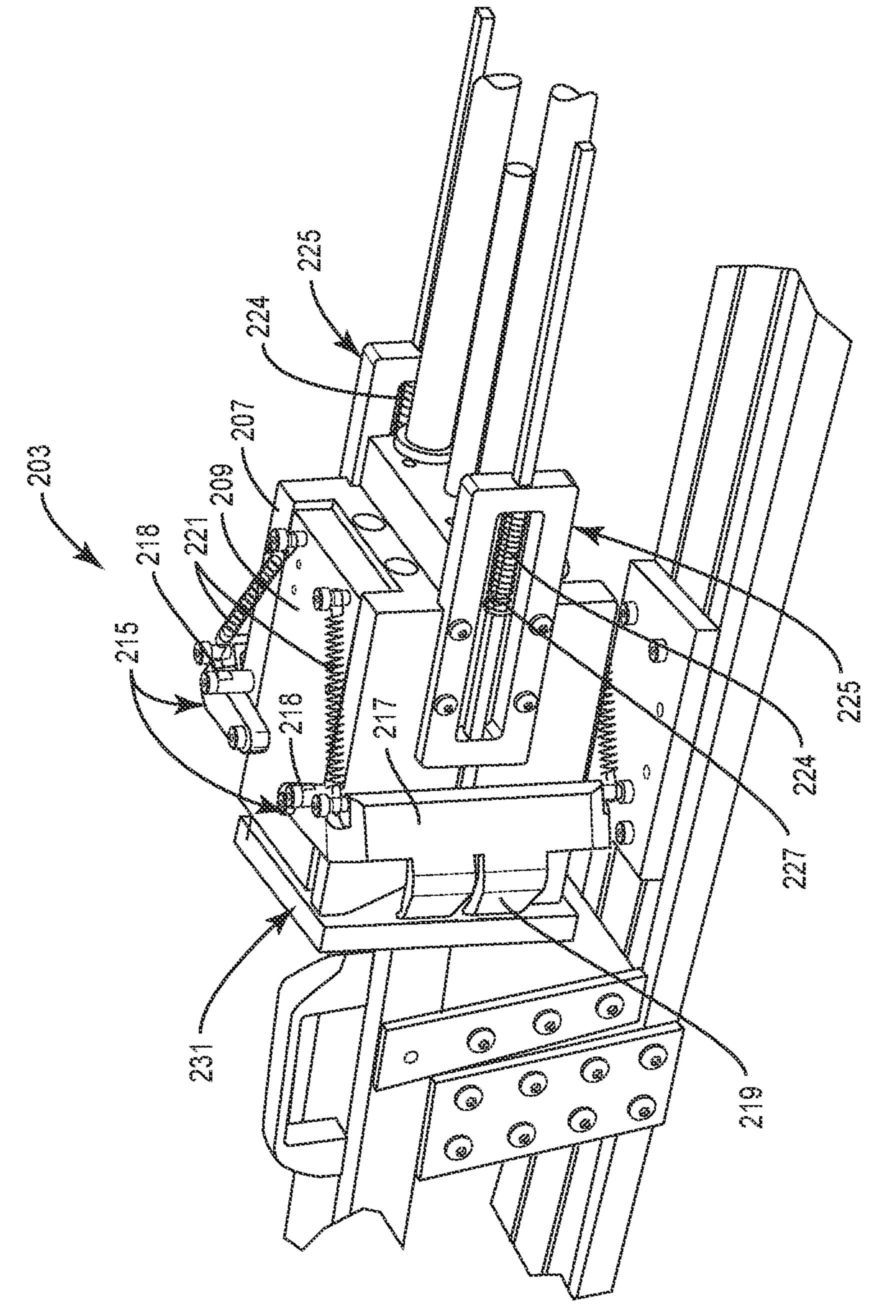

In such arrangement, and as shown best in FIGS. 9-11, the actuator 195 of the tray forming apparatus 189 can be activated to advance the forming block 203, articulating arms 215, and engagement rods 223 in the direction of the arrow A6 toward the tray forming member 231 such that the tray forming member 231 and blank 19 positioned therebetween is at least partially received in the interior 211 of the forming block 203.

As the engagement rods 223 approach the blank 19, the ends of the engagement rods 223 can contact the respective side panels 31, 35 and cause them to at least partially fold at the respective fold lines 33, 37 toward at least partial face-to-face contact with respective side portions 235 of the tray forming member 231.

Thereafter, the ends of the front portion 209 and the back portion 209 of the forming block 203 can contact the respective front panel 23 and back panel 27 of the blank 19 and cause them to at least partially fold at the respective fold lines 25, 29 toward at least partial face-to-face contact with respective side portions 235 of the tray forming member 231.

In addition, the ends of the front portion 209 and the back portion 209 of the forming block 203 can contact and cause the respective front top end flap 71 and the respective back top end flap 77 to fold at the respective fold lines 73, 79 away from the respective panels 23, 27 and against the flanged upper portion 237 of the tray forming member 231.

As the forming block 203 continues to advance under the influence of the actuator 195, the surfaces 208 of one of the side portions 207 of the forming block 203 can contact the respective side end flaps 39, 43 and, owing to their sloped configuration, fold them at the respective fold lines 41, 45 toward an at least partial face-to-face contact with the respective side panels 31, 35 positioned against respective side portions 235 of the tray forming member 231. Similarly, the surfaces 208 of the other side portion 207 of the forming block 203 can contact the respective side end flaps 47, 51 and fold them at the respective fold lines 49, 53 toward an at least partial face-to-face contact with the respective side panels 31, 35 positioned against respective side portions 235 of the tray forming member 231.

Simultaneously or thereafter, the articulation lugs 218 extending from the forming block 203 can contact the articulating arms 215 and cause them to pivot forwardly relative to the forming block 203 in the direction of the respective arrows A7, A8 such that the curved finger portions 219 approach the respective reinforcement tabs 55, 57, 59, 61 and cause them to fold at the respective fold lines 63, 65, 67, 69 against respective portions of the side top end flaps 81, 85. Furthermore, the side top end flaps 81, 85 can be contacted by the curved finger portions 219 of the respective articulating arms 215 to cause them to fold at the respective fold lines 83, 87 away from the respective side end panels 31, 35 and against the respective bump members 238.

It will be understood that as the forming block 203 is advanced toward a fully forward position, the springs 224 associated with the respective engagement rods 223 can be compressed between edges of the respective mounts 225 and the respective stops 227 to allow the engagement rods 223 to move rearwardly, e.g., toward the respective mounts 225, upon meeting resistance at the tray forming member 231.

In such an arrangement, the tray 20 can be formed from the blank 19 about the tray forming member 231, and can be at least partially recessed within the interior 211 of the forming block 203. Such an arrangement can be maintained for a predetermined time period, for example, up to and including one second or more, for example, to allow adhesives, coatings, or other applied substances to try, cure, take hold, etc., to maintain integrity of the tray 20.

Upon formation of the tray 20 as described above, the actuator 195 can be engaged to withdraw the forming block 203, articulating arms 215, and engagement rods 223 away from the tray 20 (e.g., in a direction opposite the arrow A6), exposing the formed tray 20 about the tray forming member 231. The tension springs 221 can bias the articulating arms 215 toward an initial, retracted, position during such withdrawal of the forming block 203 from the tray forming member 231. In the illustrated embodiment, the mandrel(s) 240 can frictionally engage interior surfaces of the formed tray 20 so as to maintain the tray 20 in engagement with the forming member 231.

In order to disengage or eject the formed tray 20 from the tray forming member 231, the actuator 247 of the ejection assembly 245 can be activated to drive the ejection pins 255 in the direction of the arrow A9 through the respective apertures 243 of the mounting plate 241 and the respective apertures of the tray forming member 231 to contact respective portions of the rim of the tray 20 and disengage/push the tray 20 away from the tray forming member 231.

As described above, the operation of the forming apparatus 189 can be paused momentarily following the formation of a tray 20. During such pause or down time, another blank 19 (broadly, "second blank") can be received in the other receiving portion 183, 185 of the frame 181 of the shuttle assembly 177, and the shuttle assembly 177 can be actuated to position the blank 19 between the first tray forming portion 191 and the second tray forming portion 193 of the other tray forming apparatus 189, the operation of such other tray forming apparatus 189 following one or more of the steps described above.

In this regard, as one formed tray 20 is being finalized or set in one tray forming apparatus 189, a sequentially next blank 19 in the system 100 can be moved into position for engagement/tray forming by the other tray forming apparatus 189, for example, to increase tray output/minimize down time.

The ejected trays 20 can fall downwardly toward the conveyor belt 257 therebelow, which can be driven to deposit the trays 20 in the chute 259 or other receiving structure. As shown, the trays 20 can be deposited on their sides such that adjacent trays 20 are positioned for a nesting arrangement. As described above, the actuator 261 can be activated to drive the piston rods 263 to contact the trays 20 to nest/stack the trays 20 in the chute 259, for example, for storage, shipping, etc.

It will be understood that one or more components of the system 100 can have a different configuration, position, arrangement, etc., without departing from the disclosure.

Figure 12:
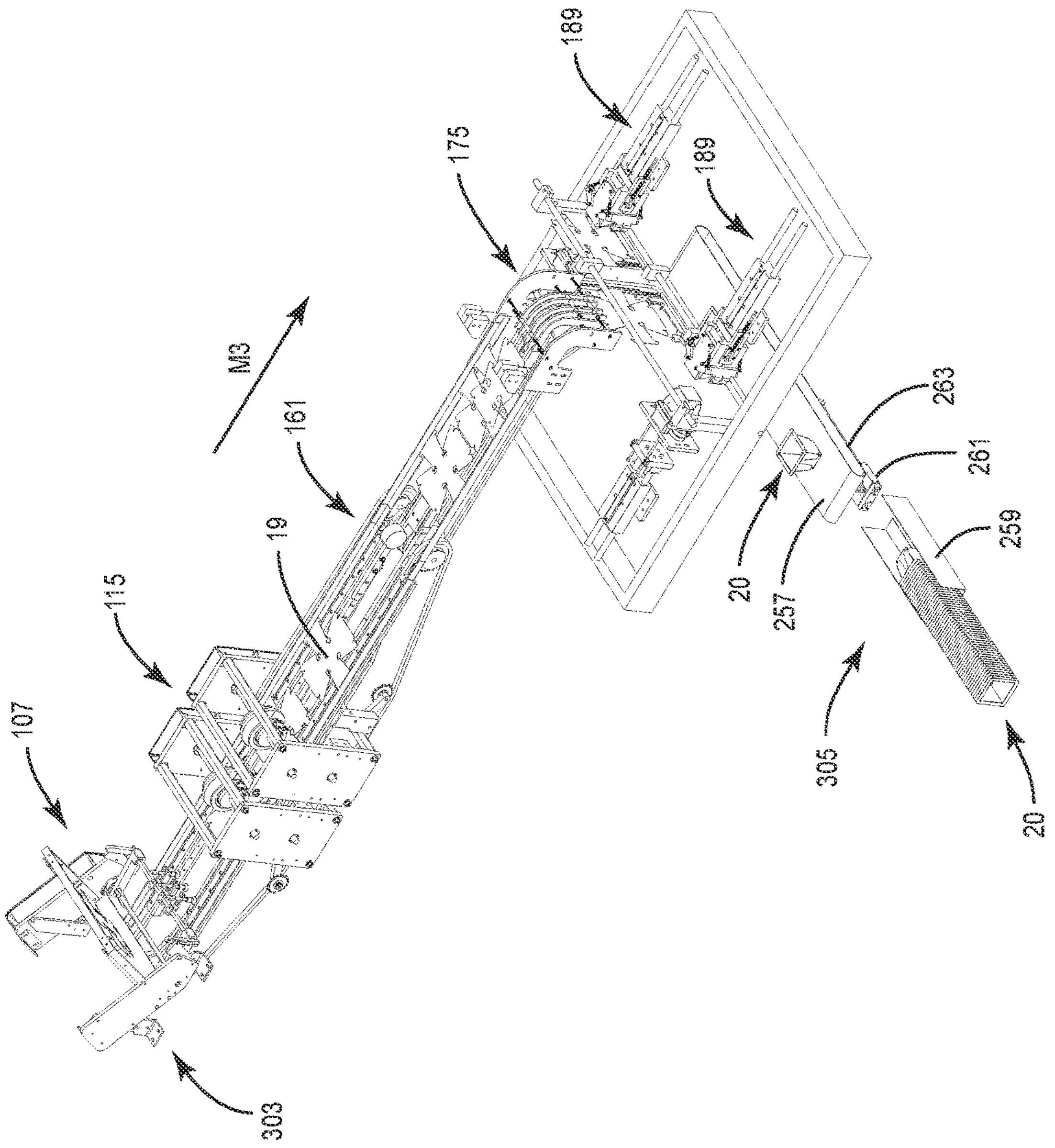
FIG. 12 is a perspective view of a system and method for preparing blanks for forming trays according to a second exemplary embodiment of the disclosure.

Turning to FIG. 12, a system for preparing/processing blanks 19 into trays 20 according to a second exemplary embodiment of the disclosure is generally designated 300. The system 300 can have one or more components similar to those described above with respect to the system 100 according to the first exemplary embodiment, and like or similar features are designated with like or similar reference numerals.

As shown, the system 300 can have one or more subassemblies/components in common with the system 300, but can be devoid of the flap folding assembly 131 and the turning station 151. In this regard, the system 300 can be configured with an upstream end 303 and a downstream end 305, with a machine direction M3 extending from the upstream end 303 to the downstream end 305, and along which blanks 19 can be advanced/handled by the blank feeder assembly 107, the denicking assembly 115, the nipping assembly 161, and the tray forming assembly 175 in a manner similar to that described above with respect to the system 100. However, as the system 300 is devoid of the flap folding assembly 131, the reinforcement flaps 72, 76 may be folded into at least partial face-to-face contact with the respective top end flaps 71, 77 prior to being loaded into the blank infeed assembly 107.

It will be understood that one or more components of the system 300 can have a different configuration, position, arrangement, etc., without departing from the disclosure.

Figure 13:
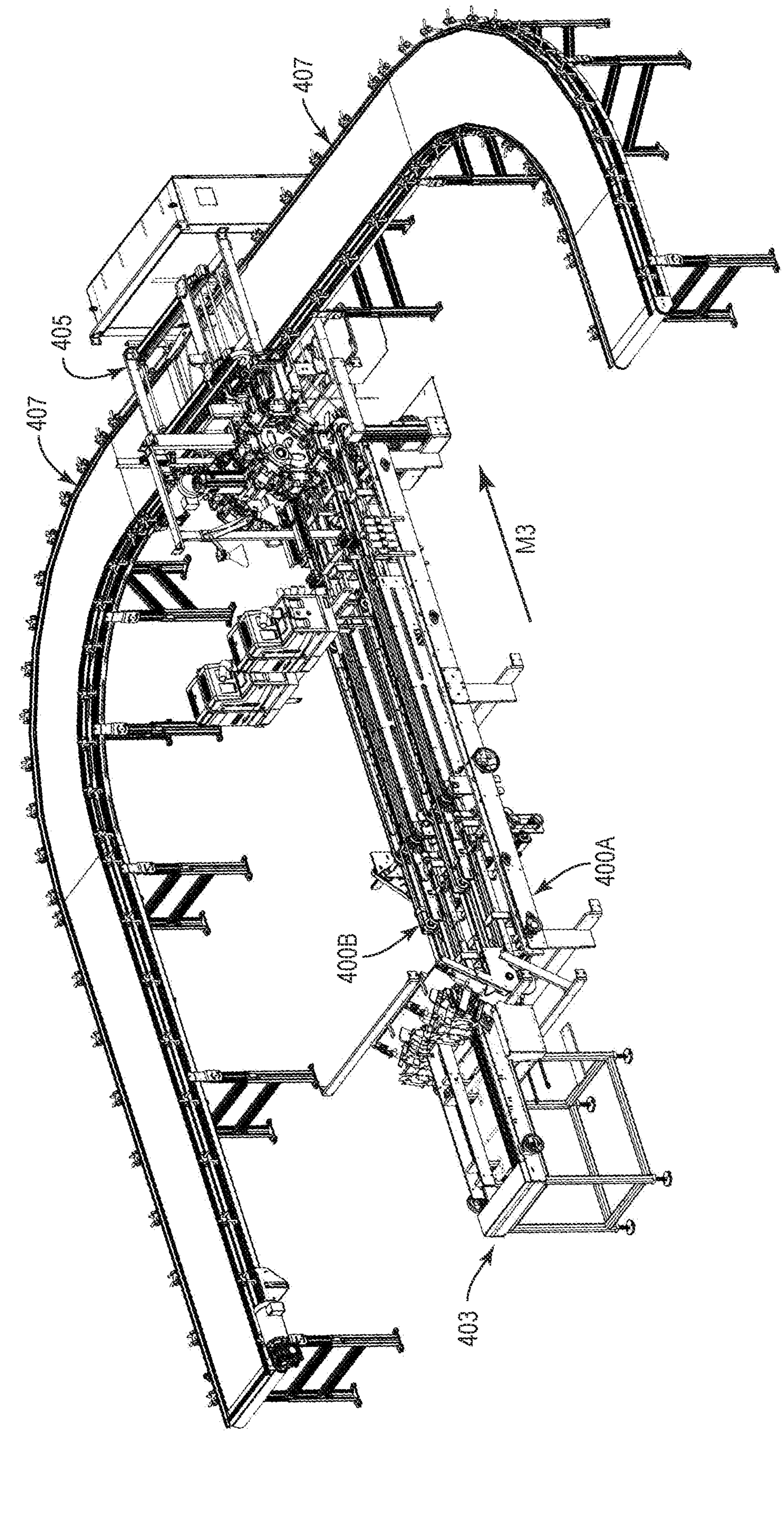
FIG. 13 is a perspective view of a system and method for preparing blanks for forming trays according to a third exemplary embodiment of the disclosure.

Turning to FIG. 13, a system for preparing/processing blanks 19 and/or forming such blanks 19 into trays 20 according to a third exemplary embodiment of the disclosure is generally designated 400. The system 400 can have one or more components similar to those described above with respect to the systems 100, 300 according to the first and second exemplary embodiments, and like or similar features are designated with like or similar reference numerals.

As described above with respect to the systems 100, 300, the blanks 19 can move through the system 400 from an upstream end 403 to a downstream end 405 thereof generally in a machine direction M3. As shown, the downstream end 405 of the system 400 can include or be associated with one or more exit conveyors 407 that can transport trays 20 formed from the blanks 19, for example, to further processing stations, to product filling stations, to product grouping and/or wrapping stations, etc.

It will be understood that the components of the system 400 described herein can be supported on one or more frames, e.g., platforms, legs, struts, bars, platforms, casters, connecting portions thereof, etc.

As also shown, the system 400 can include one or more lanes, each for processing a respective series of blanks 19 in generally linear succession along the machine direction M3. In the illustrated embodiment, the system 400 can include a first lane 400A and a second lane 400B, each lane receiving and processing a respective series of blanks 19. The components and discussion herein will be directed to the lane 400A, though it will be understood that the same or similar components can be provided to process blanks 19 in the lane 400B.

In some embodiments, components of the system 400 can be configured to process blanks 19 associated with the lane 400A in parallel with blanks 19 associated with the lane 400B. In some embodiments, duplicate components of the system 400 can be provided for both the lane 400A and 400B, and, in some embodiments, such duplicate components can be arranged to be a mirror image of those associated with the lane 400A about an axis extending generally parallel to and between the lanes 400A and 400B. In some embodiments, components of the system for supporting or operating components associated with the lane 400A can be common to those components associated with the lane 400B, e.g., frames, motors, actuators, transmissions, etc. It will be understood that a greater or lesser number of lanes can be provided without departing from the disclosure.

Figure 14:
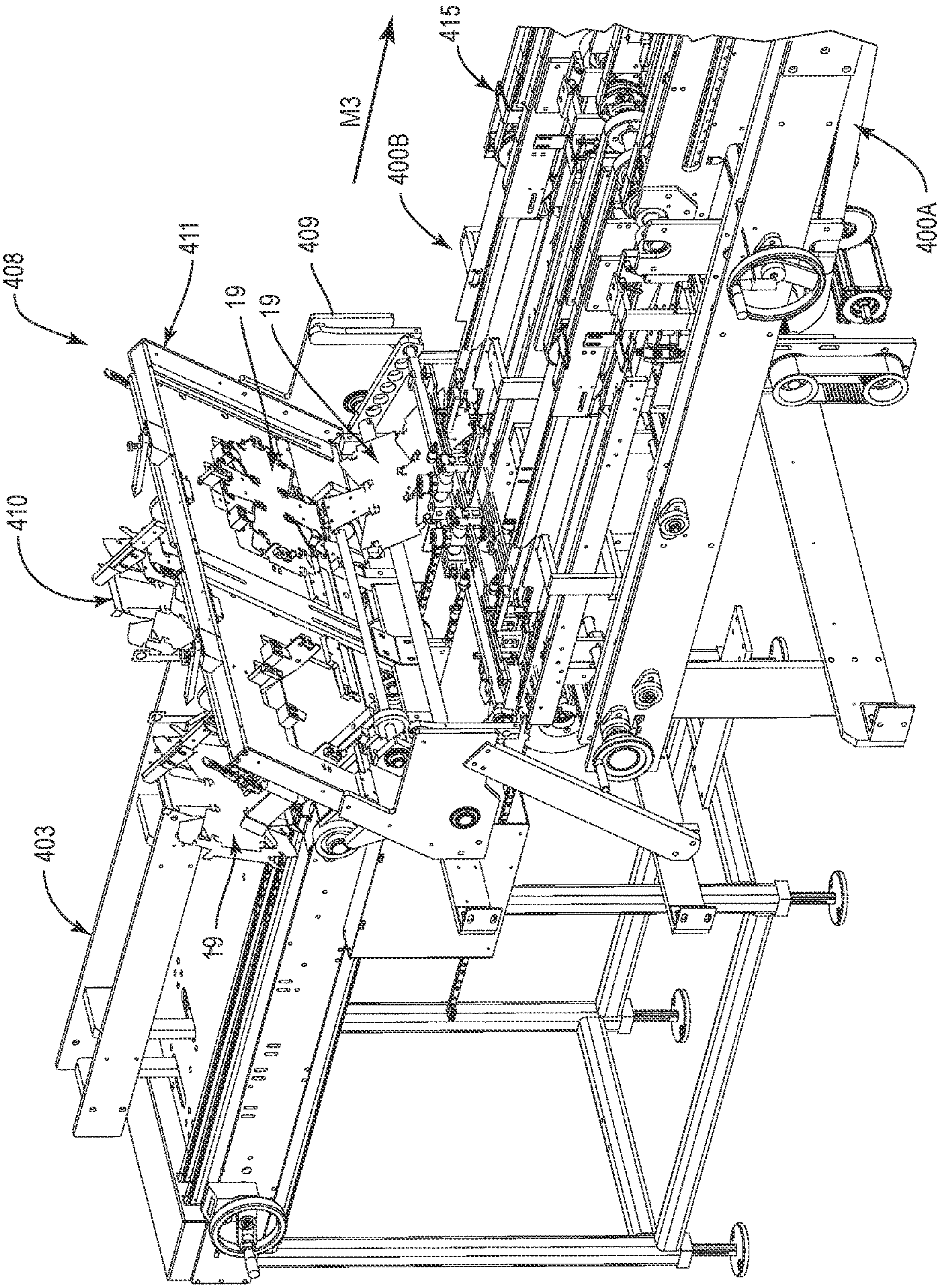
FIG. 14 is a perspective view of an upstream portion of the system of FIG. 13 including a blank feeder assembly.

With additional reference to FIG. 14, the system 400 can include a blank feeder assembly 408 proximate the upstream end 403 thereof for receiving and sequentially distributing blanks 19 in the machine direction M3 of the system 400. As shown in FIG. 14, the blank feeder assembly 408 can include a housing/base 409 that supports a blank infeed 410 for receiving one or more of the blanks 19. As shown, the blank infeed 410 can have a chute or hopper-like configuration for receiving blanks 19 in a stacked configuration.

A blank distribution mechanism 411 can be positioned in communication with a bottom or exit end of the blank infeed 410. The distribution mechanism 411 can be configured to engage and move one or more of the blanks 19 from the blank infeed 410 in the machine direction M3 of the system 400. In this regard, the distribution mechanism 411 can include a rotatable wheel, shuttle, movable plate, etc. operatively coupled with an actuator such as a drive shaft, piston, linkage, etc. In one embodiment, the blank distribution mechanism 411 can include one or more suction arms mounted on an actuator for engaging one or more blanks 19 via a vacuum or suction seal and moving the blanks 19 to a desired location, e.g., a pick-and-place mechanism.

Figure 15:
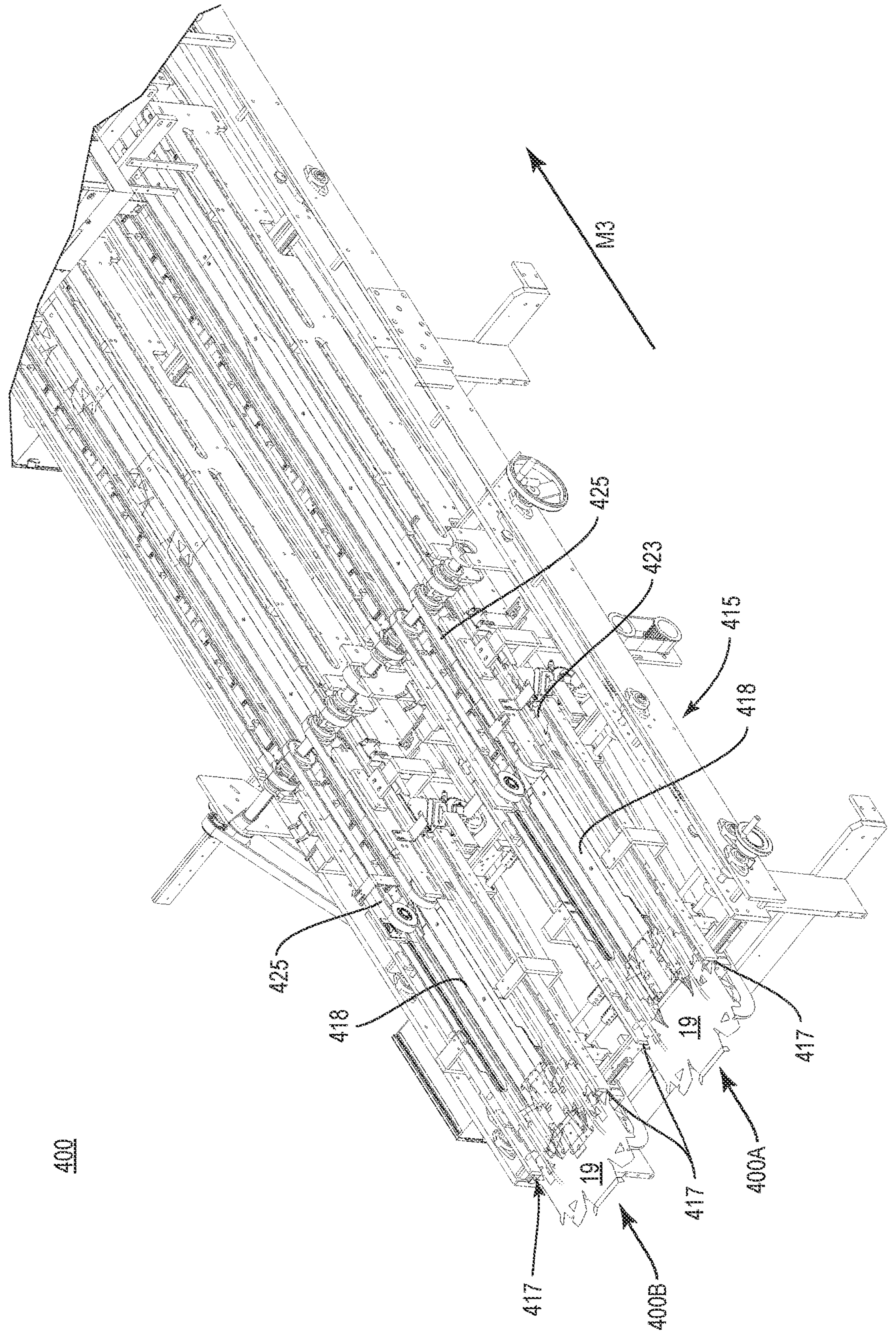
FIG. 15 is a perspective view of a portion of a blank conveyor assembly of the system of FIG. 13.

With additional reference to FIG. 15, As shown, the blank distribution mechanism 411 can be positioned to place/deposit blanks 19 sequentially onto a blank conveyor assembly 415 for transferring the blank 19 in the machine direction M3 toward the downstream end 405 of the assembly 400. In the illustrated embodiment, the blank conveyor assembly 415 can include a pair of parallel and spaced apart guide rails

417 extending generally in the machine direction M3 for supporting portions of the blanks 19. The guide rails 417, in one embodiment, can have a generally right angle or L-shaped configuration, through the guide rails 417 could have a different configuration without departing from the disclosure.

As also shown, one or more blank supports 418 can be positioned between the guide rails 417, the blank support 418 having a generally flat smooth profile so as to facilitate movement of respective blanks 19 therealong.

One or more blank moving members 423 can be positioned below the guide rails 417 and the blank support(s) 418 and arranged so as to cause blanks 19 to move along the blank conveyor assembly 415 in the machine direction M3. The blank moving members 423 can have generally elongate configuration arranged in a closed/looped (for example, elliptical), arrangement, e.g., bands, belts, plates, rods, chains, etc.

Figure 16:
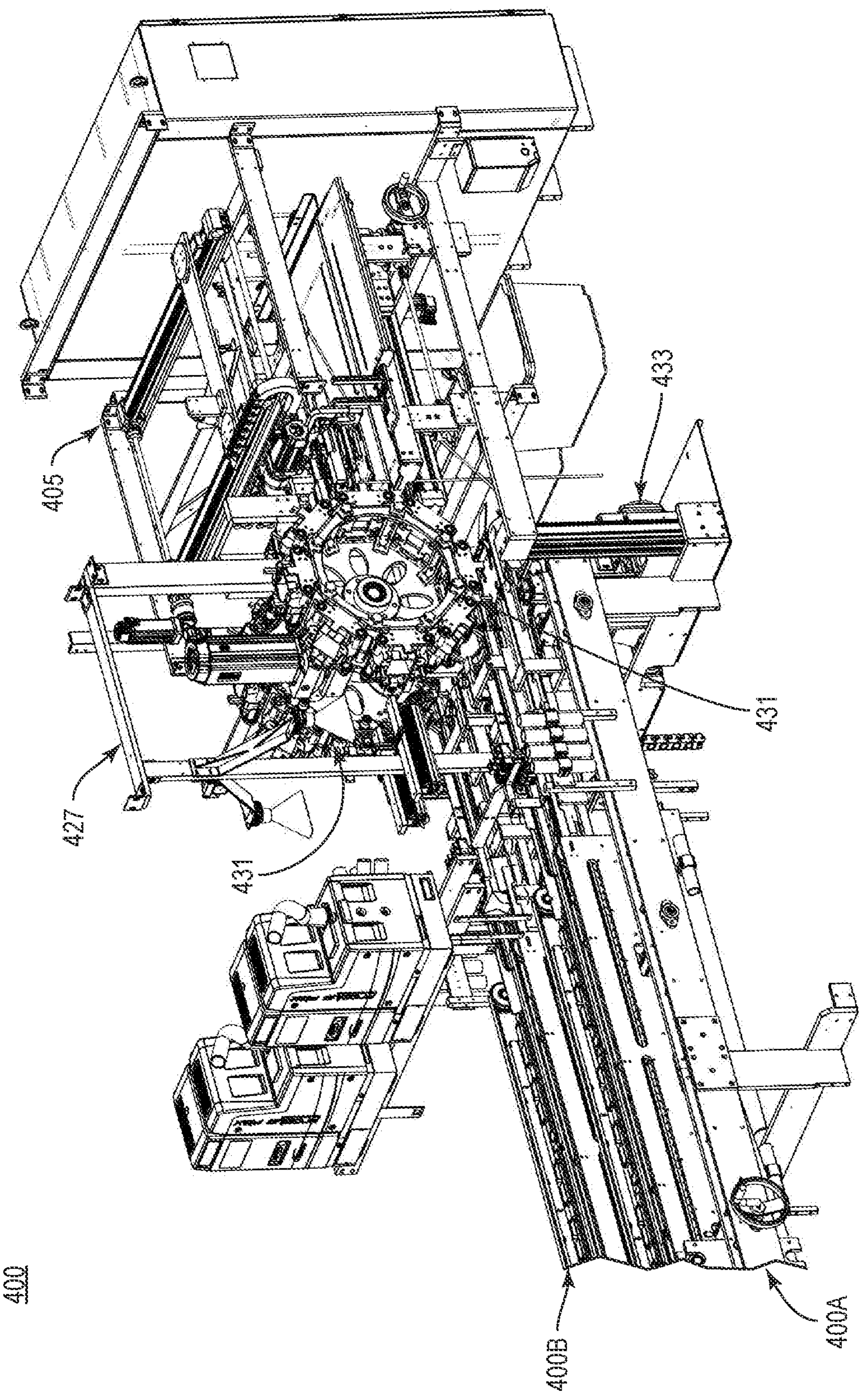
FIG. 16 is a perspective view of downstream portion of the system of FIG. 13 including a tray forming assembly.

In this regard, the blank moving members 423 can be operably coupled to a driving mechanism, e.g., rotational components such as rollers, pulleys, gears, belts, etc. of the system 400. In one embodiment, such rotational components can be directly rotated by a driving member/rotational actuator, e.g., one or more motors, or one or more intermediate mechanical transmissions can be provided between such motor(s) and the rotational actuator(s). In this regard, and as described further herein, the blank moving members 423 can be driven to rotate such that respective upper portions thereof proximate the blanks 19 are moved in the machine direction M3 to carry the blanks 19 in the machine direction M3 toward a tray forming assembly 427 located proximate the downstream end 405 of the system 400, as shown in FIG. 16. In some embodiments, the blank moving members 423 can support one or more lugs or other upstanding members for contacting and moving the blanks 19 along with motion of an upper portion thereof in the machine direction M3.

The blank conveyor assembly 415 can also include a pair of parallel and spaced apart blank engaging members 425 positioned above and between the guide rails 417 closed/looped (for example, elliptical), arrangement, e.g., bands, belts, plates, rods, chains, etc. In some embodiments, one or both of the engaging members 425 can be formed of a stretchable material, e.g., an elastomeric material or otherwise elastically deformable and/or resilient material.

The blank engaging members 425 can be operably coupled to a driving mechanism, e.g., rotational components such as rollers, pulleys, gears, belts, etc. of the system 400. In one embodiment, such rotational components can be directly rotated by a driving member/rotational actuator, e.g., one or more motors, or one or more intermediate mechanical transmissions can be provided between such motor(s) and the rotational actuator(s). In this regard, and as described further herein, the blank engaging members 425 can be configured to exert one or more downward forces on respective blanks 19 moving through the system 400, for example, to influence shaping of the blanks 19, to pace the rate and/or separation of adjacent blanks 19 moving through the system 400, etc.

Figure 17:
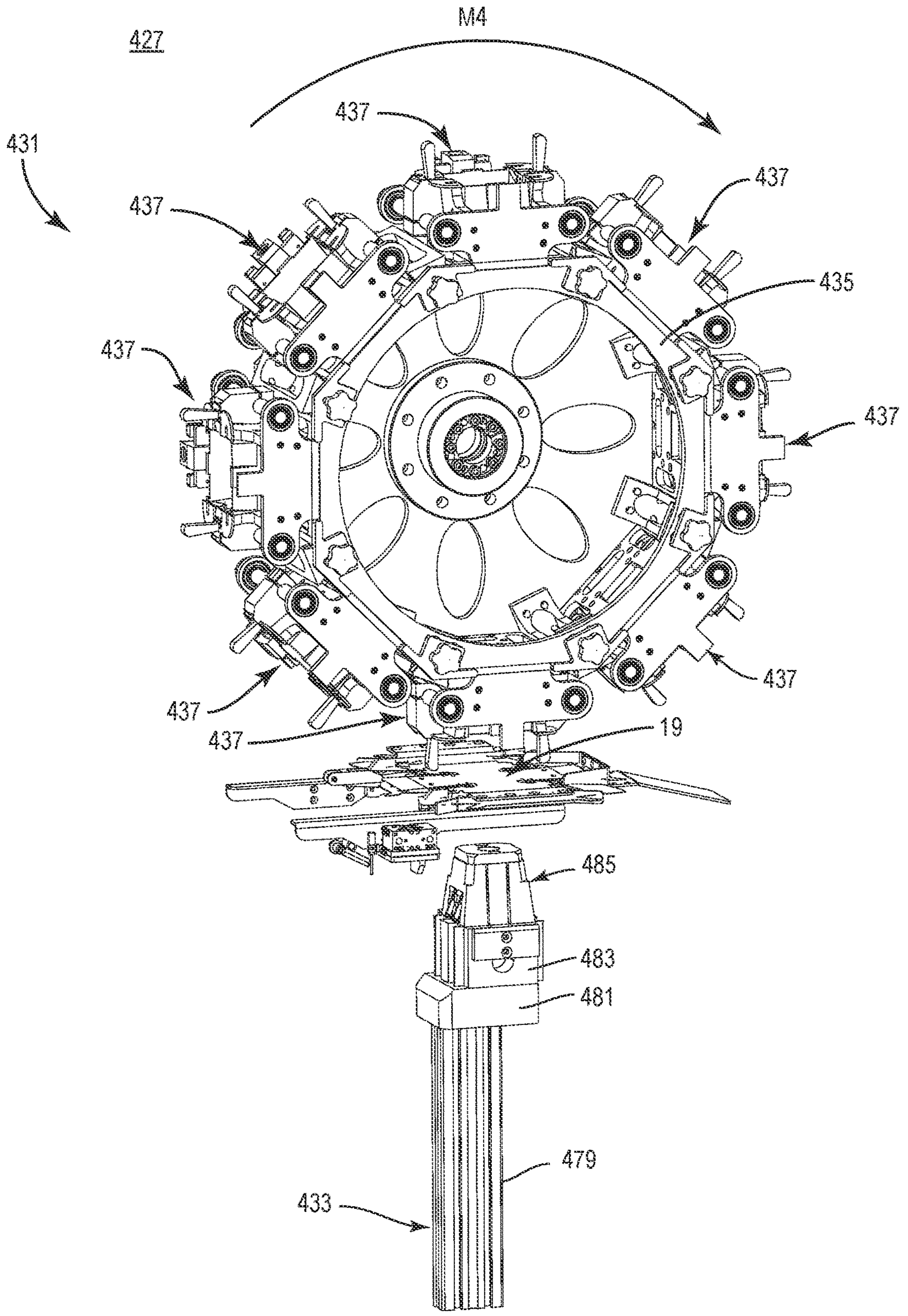
FIG. 17 is a perspective view of a turret assembly and a piston assembly of the tray forming assembly of the system of FIG. 13.

As shown, in FIG. 17, the tray forming assembly 427 can include a tray forming apparatus 429 that include turret assembly 431 (broadly, "first tray forming apparatus") and a piston assembly 433 (broadly, "second tray forming apparatus"). A blank support an be positioned between the turret assembly 431 and the piston assembly 433 for supporting a respective blank 19 prior to processing by the tray forming assembly 427. In some embodiments, a respective blank 19 can be supported proximate free end portions thereof along the machine direction M3 such that only the respective blank 19 is positioned between the turret assembly 431 and the piston assembly 433.

Figure 22:
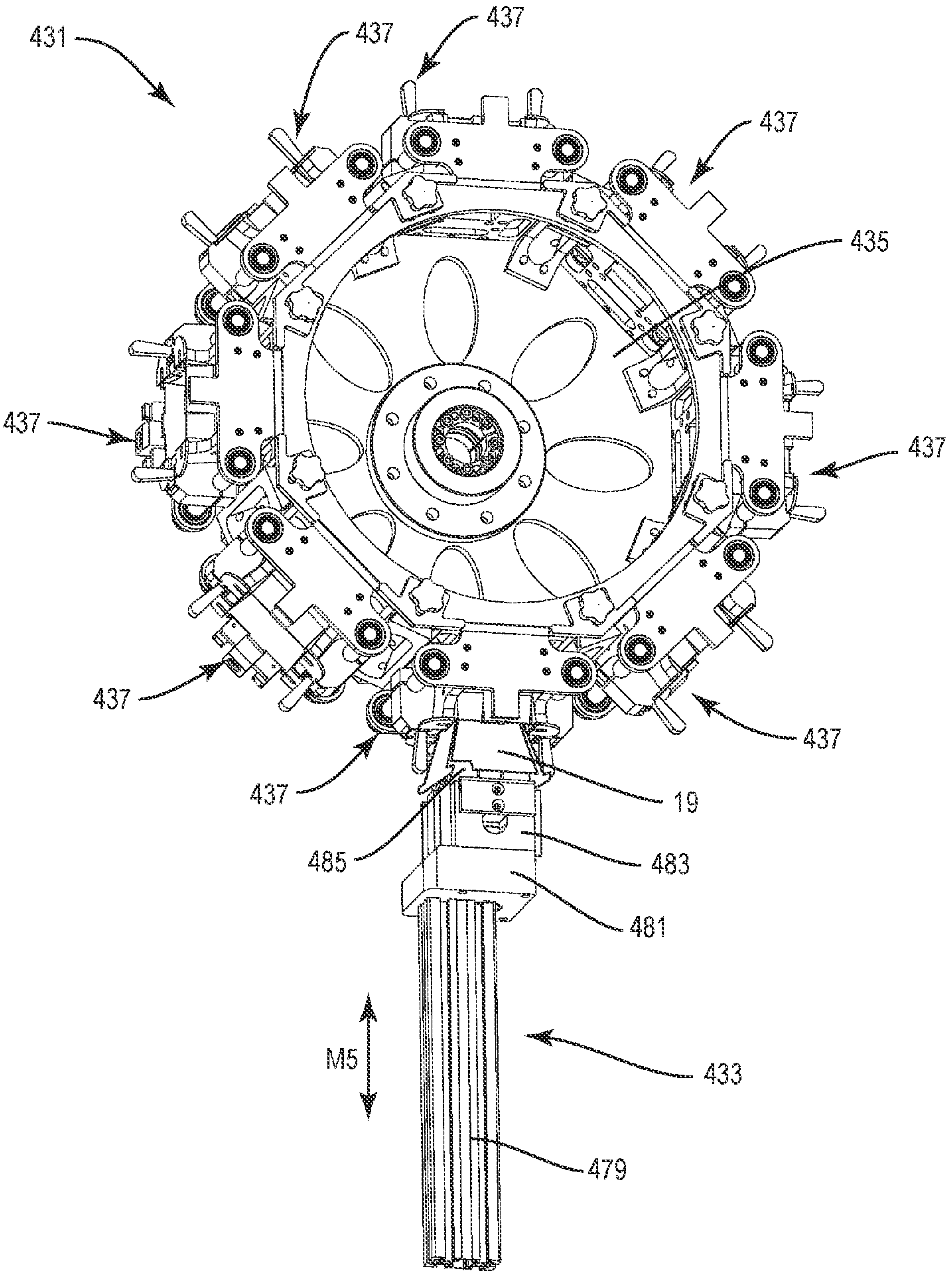
FIG. 22 is a perspective view of the portion of the tray forming apparatus of the system of FIG. 13 showing an operation thereof.

As described further herein, the turret assembly 431 and the piston assembly 433 are movable relative to one another to effect formation of trays 20 from blanks 19, with the turret assembly 431 rotatably mounted along a portion of the system 400, and the piston assembly 433 linearly movable toward and away from the turret assembly 431 as indicated by the bidirectional machine direction M5 (FIG. 22).

The turret assembly 431, as shown, can include a turret body 435 supporting a plurality of female tray forming members 437 circumferentially arranged therearound. The turret body 435 can be rotatably mounted so as to be rotatable in a machine direction M4 (clockwise in the view of FIGS. 16 and 17) to move the respective female tray forming members 437 into registration with the piston assembly 433 for forming one or more blanks 19 into trays 20. In some embodiments, the turret body 435 can be rotatably mounted along the system 400 so as to be rotatable in a counter-clockwise direction from the perspective of the views illustrated in FIGS. 16 and 17).

In this regard, the turret assembly 431 can be in mechanical communication with one or more actuators and/or actuating mechanisms, e.g., motors, pneumatic actuators, hydraulic actuators, etc., that can be either directly coupled to one or more portions of the turret assembly 431 or via one or more mechanical transmissions. Such actuators and/or actuating mechanisms can independently or collectively drive the turret body 435 to rotate in the manner described herein.

Figure 18:
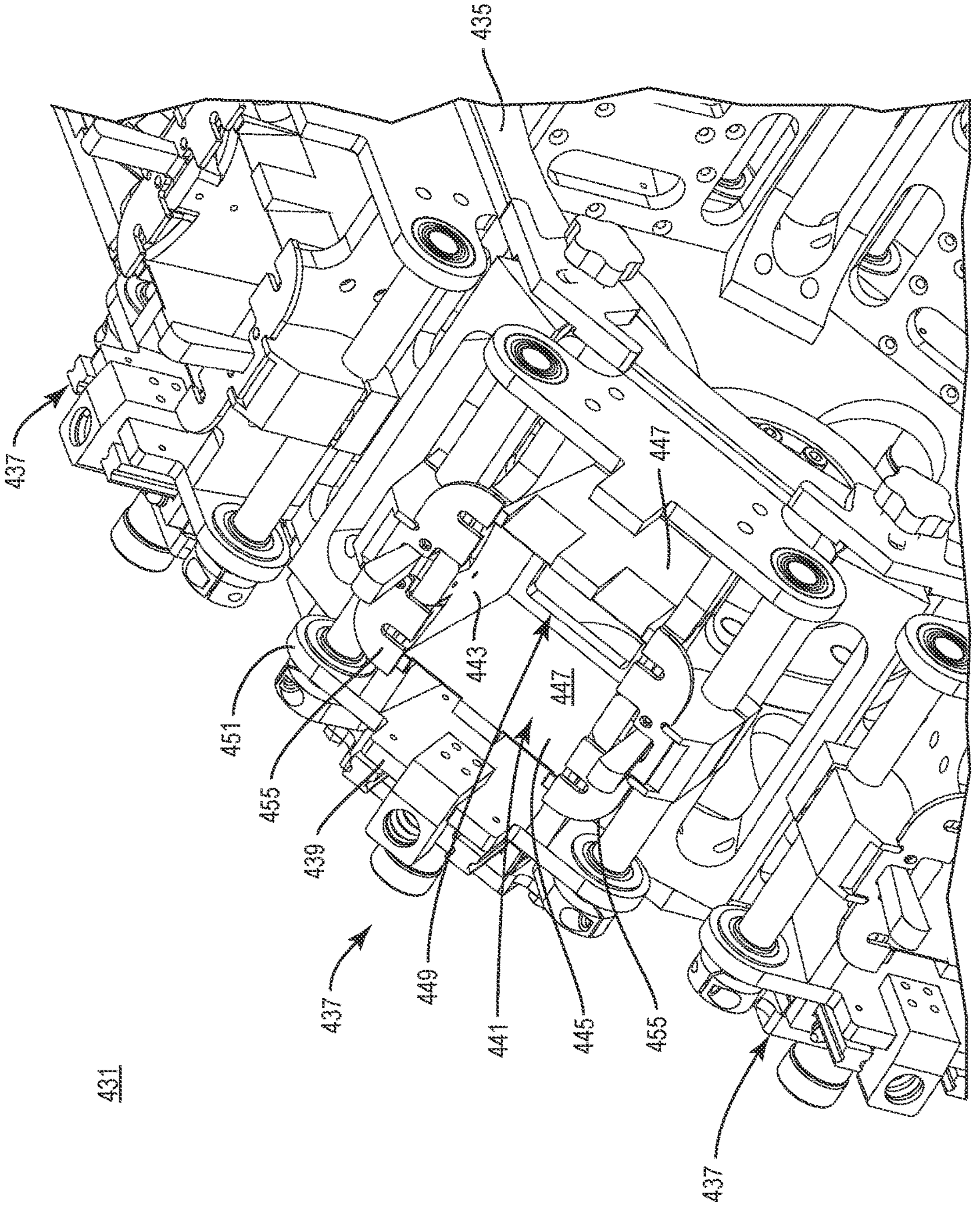
FIG. 18 is an enlarged perspective view of a portion of the turret assembly of the system of FIG. 13.
Figure 19:
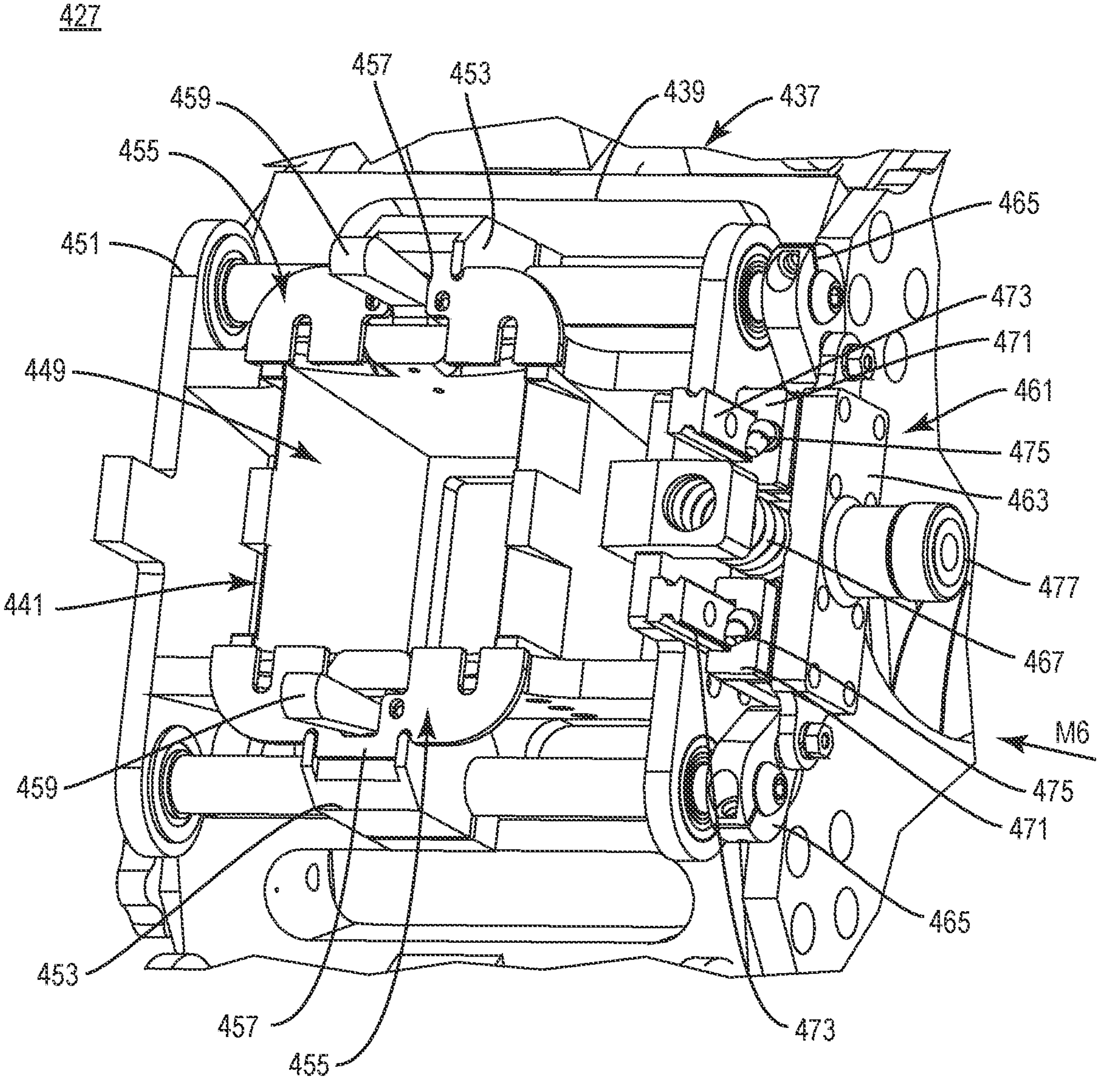
FIG. 19 is another enlarged perspective view of a portion the turret assembly of the system of FIG. 13.

With additional reference to FIGS. 18 and 19, each female tray forming member 437 can include a first or interior support frame 439 coupled to the turret body 435 for supporting the remainder of the respective tray forming member 437 thereon.

The frames 439, as shown, can at least partially define and support a respective tray forming receiver 441 having a generally tapered trapezoidal configuration and including a pair of spaced apart sides 443 at least partially defined by the respective frame 439, and a pair of spaced apart sides 445 at least partially defined by a pair of side forming plates 447 coupled to the respective frame 439. In this regard, the tray forming receiver 441 extends at least partially around an interior cavity 449.

The female tray forming members 437 can also include a second or outer support frame 451 coupled to the first support frame 439 for supporting portions of the respective tray forming member 437 thereon. As shown, a pair of plate supports 453 can be coupled to portions of the support frame 451, and can support respective flange forming plates 455 thereon.

The flange forming plates 455, as shown, can be positioned generally extending away from the respective sides 443 of the tray forming receiver 441. The flange forming plates 455 can have a generally flat or planar configuration, as shown, for providing a surface against which the flange or rim 22 of a respective tray 20 can be formed, as described further herein.

As also shown, the flange forming plates 455 are shaped so as to include a notch or recess 457 through which respective fingers 459 can be positioned to extend downwardly away from the remainder of the tray forming receiver 441. The fingers 459 can be coupled to one or both of a respective plate support 453 and the frame 439. As described herein, the fingers 459 can have a generally elongate profile and are positioned for contacting respective portions of a respective blank 19 to facilitate formation of a respective tray 20 therefrom.

At least one tray ejection apparatus 461 can also be coupled to the respective support frame 451. As shown, the tray ejection apparatus 461 can include an ejector mount 463 pivotably coupled to the respective frame 451 via a pair of links 465 that are pivotably coupled to the support frame 451 such that the ejector mount 463 is movable relative to the frame 451. The ejector mount 463 can include an interior channel for supporting a biasing member 467, e.g., a spring or other mechanical energy storage and release mechanism. In the illustrated embodiment, the biasing member 467 can be fixedly coupled to a portion of the ejector mount 463 such that the biasing member 467 can be compressed against the ejector mount 463. The biasing member 467, as shown, can be fixedly coupled to an ejector block 469 at a distal portion thereof, the ejector block 469 further coupled to a lower portion of the frame 451.

As shown, each ejection apparatus 461 can also include a pair of blocks 471 coupled to the ejector mount 463 and slidably coupled to respective rails 473 coupled to the frame 451 such that the ejector mount 463 is slidably movable with respect to the rails 473. Lower portions of the blocks 471 can include a respective tray engaging member 475, e.g., finger, tab, protuberance, etc. The tray engaging members 475, in some embodiments, can be comprised of a soft, cushioning material, e.g., a polymeric material.

An ejector adapter 477 can be supported on the ejector mount 463 so as to protrude therefrom for being engaged by a portion of the system 400, as described further herein.

Figure 20:
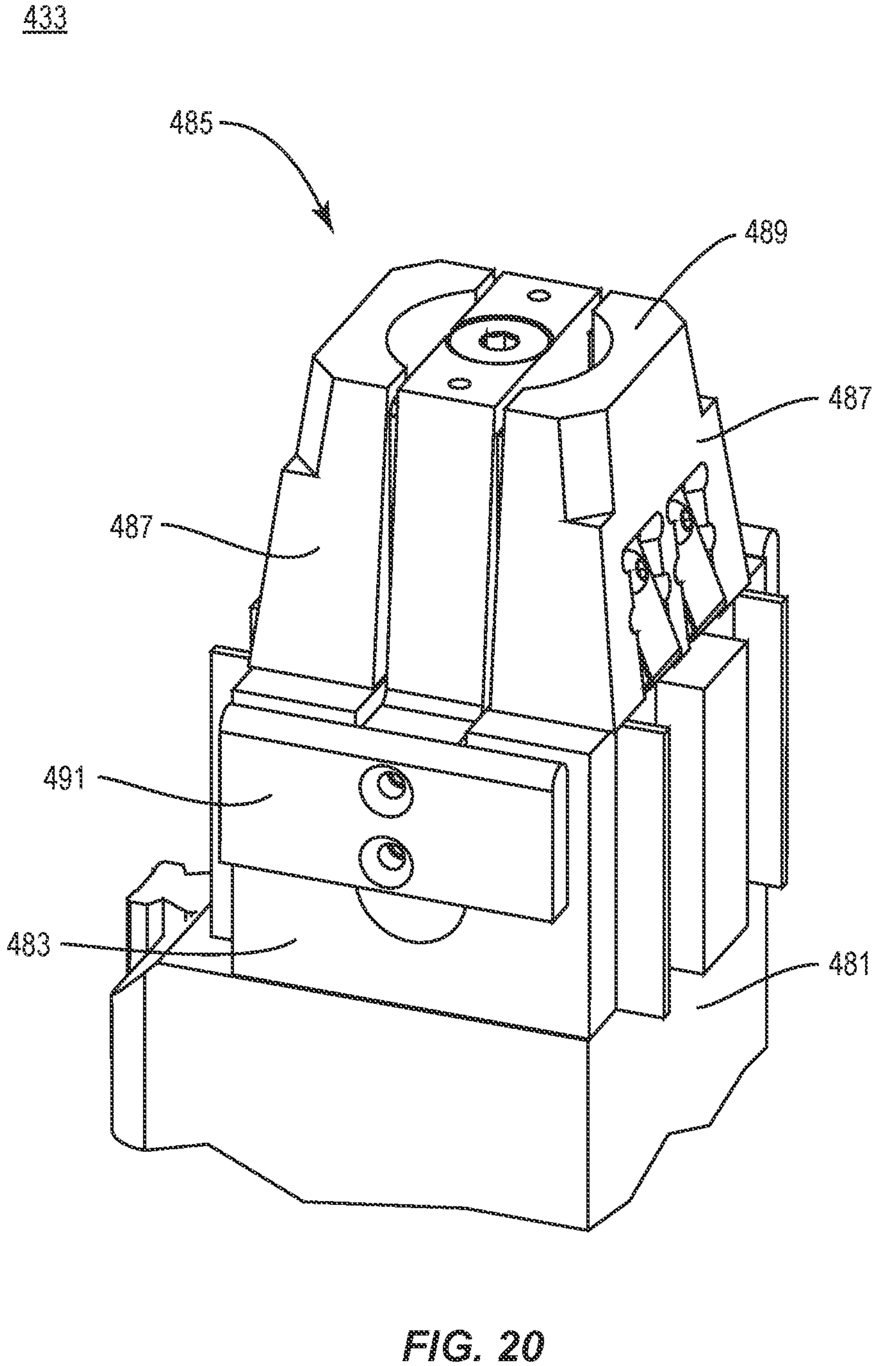
FIG. 20 is an enlarged perspective view of a portion of the piston assembly of the system of FIG. 13.
Figure 21:
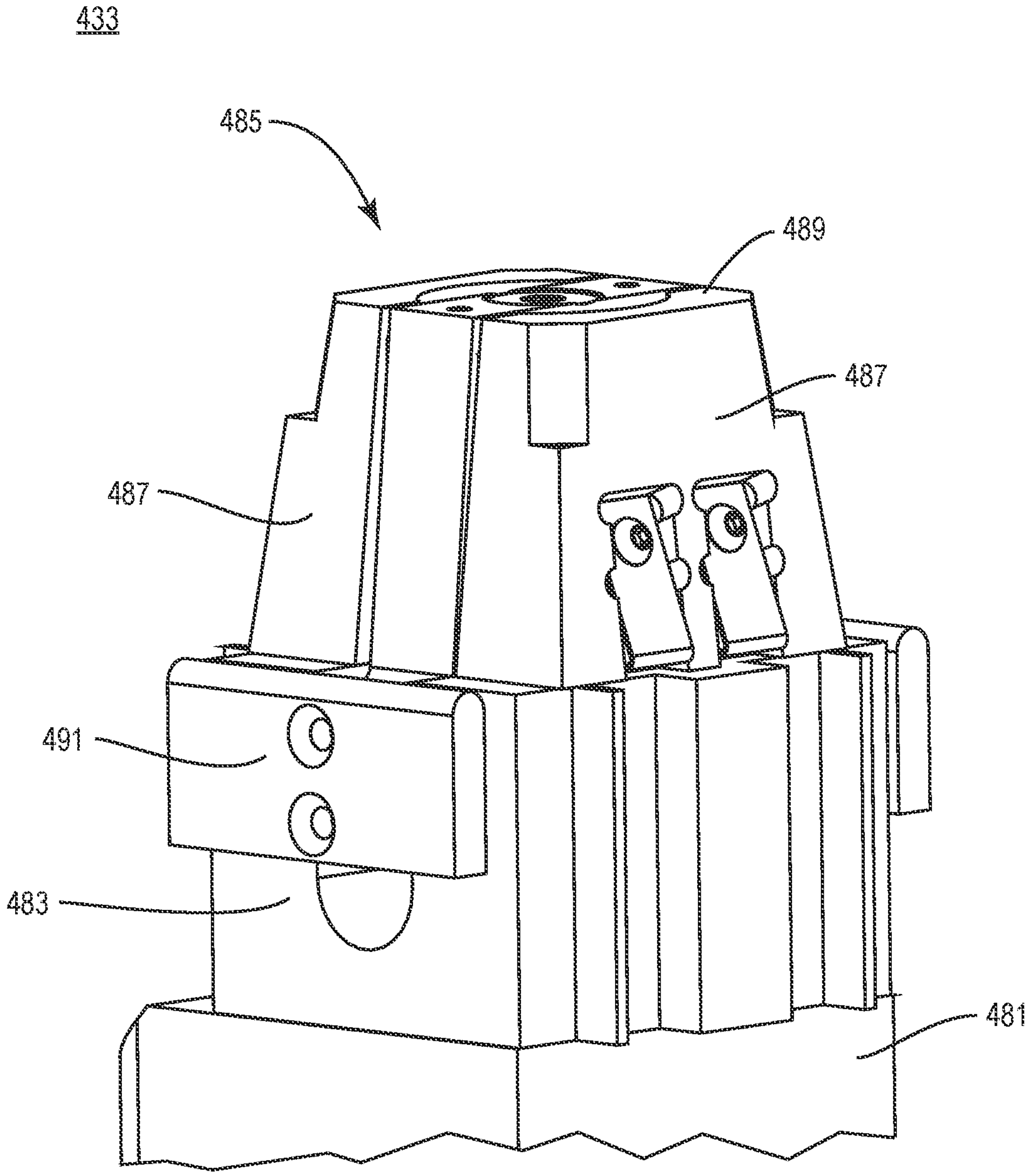
FIG. 21 is another enlarged perspective view of a portion the piston assembly of the system of FIG. 13.

With additional reference to FIGS. 20 and 21, the piston assembly 433 can include a driving member 479 that is movable toward or away from the turret assembly 431, for example, via movement of an actuator such as a pneumatic or hydraulic piston, linear actuator, etc. The driving member 479 can be coupled at a distal end thereof to a platform 481 upon which a tray forming mount 483 is supported.

The tray forming mount 483 supports a male tray forming member 485, as shown. The male tray forming member 485, has a generally tapered trapezoidal configuration that is generally complementary to the profile of the tray forming receivers 441 described above, e.g., so as to at least partially define a plurality of sides 487 obliquely arranged relative to a generally flat bottom 489. As described further herein, the male tray forming member 485 is for being at least partially received in a tray forming receiver 441 of a respective female tray forming member 437.

A pair of flange forming members 491 can be coupled to the tray forming member 485, as shown, and can have a generally elongate bar-like configuration for forming flanges 22 of the respective trays 20, as described further herein.

It will be understood that one or more portions of the tray forming assembly 427 can be differently arranged and/or configured without departing from the disclosure.

With reference to FIGS. 13-22, formation of one or more trays 20 from respective blanks 19 with the system 400 will be described according to an exemplary embodiment of the disclosure. As described herein, activation or actuation of one or more components of the system can include energizing motors, either directly driving a component or via one or more mechanical transmissions, driving/activating other pneumatic/hydraulic or other actuators, engaging one or more other components, etc.

One or more of the blanks 19 can be obtained and loaded into the blank feeder assembly 408. In some embodiments, the blanks 19 can be positioned with the lateral axis L2 arranged vertically in the blank infeed 410, e.g., such that either the front reinforcement flap 72 or the back reinforcement flap 76 is positioned as the lowermost element of the blank 19 in the blank infeed 410, and with the exterior surface 18 of the blank 19 generally facing in the machine direction M3. In some embodiments, the blanks 19 can be positioned with the longitudinal axis L1 arranged vertically. In some embodiments, the blanks 19 can be positioned with the exterior surface 18 thereof generally facing a direction opposite the machine direction M3.

As shown, a series of blanks 19 can be fed into the system 400, with a plurality of blanks 19 for being fed into the lane 400A, and a plurality of blanks 19 being fed into the lane 400B. For clarity of description, the following processes will generally be described with respect to a single blank 19 fed into the lane 400A, but it will be understood that such processes can be repeated in series for each blank 19 moving through a respective lane 400A, 400B of the system 400.

The blank distribution mechanism 411 can be activated to engage a respective blank(s) 19 such that the blanks 19 carried thereon can be moved/pivoted, etc. toward the blank conveyor assembly 415.

In some embodiments, one or more portions of the blank distribution mechanism 411 can be configured to contact the denesting tabs 91 of the blanks 19 to at least partially separate them from the surrounding portions of the blanks 19.

The blank 19 can be positioned with the exterior surface 18 facing upwardly and supported by the guide rails 417 and blank supports 418. Activation of one or more gears, rollers, etc. about which the blank moving members 423 extend can cause the blank moving members 423, for example, via direct frictional engagement or via one or more fingers or lugs coupled thereto, to move in the machine direction M3.

The blank engaging members 425 can be further driven to rotate so as to engage the exterior surfaces 18 of the respective blanks 19. For example, the blank engaging members 425 can provide a predetermined level of pressure on the exterior surfaces 18 of the respective blanks 19, for example, to provide and/or maintain a generally flat configuration of the blanks 19, to maintain alignment of the blanks 19 along the machine direction M3, to provide a desired spacing between adjacent blanks 19, etc. In this regard, the blank engaging members 425 can be driven to rotate generally in sync, e.g., so as to have a generally similar rotational speed, with the blank moving members 423.

Furthermore, the blank engaging members 425 can be positioned a preselected vertical distance above the blanks 19 so as to provide a preselected level of contact/pressure thereon. In some embodiments, the blank engaging members 425 can be vertically adjustable relative to the blanks 19.

In some embodiments, one or more blank engaging features, e.g., lugs, tabs, fingers, etc., can be carried on the blank engaging members 425 for engaging one or more portions of the blanks 19.

As the blank 19 advances forwardly in the machine direction M3, the blank moving members 423 can be driven to carry the blank 19 into the tray forming assembly 427 between the turret assembly 431 and the piston assembly 433. As shown, a respective turret assembly 431 and piston assembly 433 can be provided to engage blanks 19 in each lane 400A, 400B, of the system 400, though a different arrangement could be provided without departing from the disclosure.

At such position, the turret assembly 431 can be rotatably positioned such that a respective female tray forming member 437 of the plurality of female tray forming members 437 can be positioned directly above the respective blank 19.

Thereafter, and with additional reference to FIG. 22, the piston assembly 433 can be actuated, e.g., via movement of an actuator associated with the driving member 479 thereof to cause the platform 481, mount 483, and male tray forming member 485 coupled thereto to move upwardly into engagement with the blank 19 and the respective tray forming member 437.

As the male tray forming member 485, with the blank 19 engaged by the bottom 489 thereof, approaches the tray forming receiver 441 and the cavity 449, fingers 459 extending downwardly from the female tray forming member 437 as well as downwardly depending portions of the outer support frame 451 can contact the respective side panels 23, 27, 31, 35 to cause them to begin to fold downwardly relative to the bottom panel 21 at the respective fold lines 25, 29, 33, 37. In some embodiments, further movement of the blank 19 toward the female tray forming member 437 by the male tray forming member 485 can cause the side panels 23, 27, 31, 35 of the blank 19 to contact the free edges of the sides 443, 445 of the tray forming receiver 441 to cause the side panels 23, 27, 31, 35 to fold further fold downwardly relative to the bottom panel 21 at the respective fold lines 25, 29, 33, 37 and at least partially around an interior of the tray 19.

In this regard, the bottom panel 21 of the blank 19 can be pushed further into the cavity 449 of the tray forming receiver 441, with the side panels 23, 27, 31, 35 of the blank 19 folded into at least partial face-to-face contact with the respective sides 443, 445 of the tray forming receiver 441.

Such engagement of the piston assembly 433 with a respective female tray forming member 437 of the turret assembly 431 can at least partially transition the blank 19 toward/into a tray 20, with the side panels 23, 27, 31, 35 thereof extending obliquely downwardly away from the bottom panel 21 such that the panels 23, 27, 31, 35 extend at least partially around an interior of the tray 20.

Thereafter, continued movement/engagement of the piston assembly 433 relative to the turret assembly 431 can position respective top end flaps of the top end flaps 71, 77, 81, 85 of the blank 19/tray 20 between the respective flange forming plates 455 and an upper surface of the mount 483, and between the plates 447 of the female tray forming member 437 and the flange forming members 491 of the male tray forming member 485.

Such engagement of the blank 19/tray 20 between the turret assembly 431 and the piston assembly 433 can cause the top end flaps 71, 77, 81, 85 to fold relative to the respective side panels 23, 27, 31, 35 at the respective fold lines 73, 78, 83, 87 to be positioned extending generally outwardly from the side panels 23, 27, 31, 35 and in generally spaced and planar relation with the bottom panel 21 to form the rim 22 of the tray 20.

It will be understood that, in some embodiments, the turret assembly 431 and the piston assembly 433 can be configured to cooperate to fold the reinforcement flaps 72, 76 at the respective fold lines 74, 78 into at least partial face-to-face contact with the end flaps 71, 77. In some embodiments, the reinforcement flaps 72, 76 can be positioned in at least partial face-to-face contact with the end flaps 71, 77 prior to engagement of the piston assembly 431 with the turret assembly 433. In some embodiments, the blank 19/tray 20 can be devoid of reinforcement flaps.

In the aforementioned arrangement, the tray 20 can be formed from the blank 19 about the male tray forming member 485, and can be at least partially recessed within the cavity 449 of the female tray forming member 437. Such an arrangement can be maintained for a predetermined time period, for example, up to and including one second or more, for example, to allow adhesives, coatings, or other applied substances to try, cure, take hold, etc., to maintain integrity of the tray 20.

Upon formation of a tray 20 as described above, the piston assembly 433 can be withdrawn from the female tray forming member 437, for example, via actuation of the driving member 479, with the tray 20 remaining in the receiver 441 of the female tray forming member 437.

The turret body 435 can be rotated in the machine direction M4 to index a circumferentially adjacent female tray forming member 437 into alignment over the piston assembly 433, and, optionally, another blank 19 can be positioned between the piston assembly 433 and the turret assembly 431 for engagement into a tray 20 in the manner described above.

The turret body 435 can be further indexed in the manner described above to form trays 20 via engagement of a respective female tray forming member 437 with the piston assembly 433.

The turret body 435 can be further indexed so as to position a respective female tray forming member 437 having a formed tray 20 at least partially received in a respective receiver 441 with a discharge point or station from which respective formed trays 20 can be ejected from the turret assembly 431 and transferred to the one or more exit conveyors 407 for transporting formed trays 20, for example, to further processing stations, to product filling stations, to product grouping and/or wrapping stations, etc.

In some embodiments, ejection of a formed tray 20 from a respective female tray forming member 437 can include at least partial engagement of a respective ejector adapter 477 with a portion of the system 400, e.g., a machine part, arm, etc. The ejector adapter 477 can be moved in a machine direction M6 (FIG. 19) that is generally downwardly toward an exit of the receiver 441 in a radially outwardly direction relative to the turret body 435.

As the ejector adapter 477 moves in the machine direction M6, the ejector mount 463 can move downwardly in the direction M6, facilitated by pivotable movement of the links 465 and at least partially resisted by increasing compression of the biasing member 467 between the ejector mount 463 and the ejector block 469.

As the ejector mount 463 moves downwardly, the block 471 can slidably move relative to the rails 473 to position the tray engaging member 475 for contact with a portion of the formed tray 20, for example, the rim 22 of the formed tray 20, to facilitate disengagement of the formed tray 20 from the receiver 441 and away from the female tray forming member 437 and toward the exit conveyors 407 and/or further processing stations.

It will be understood that one or more components of the systems 100, 300, 400 can have a different configuration, position, arrangement, etc., without departing from the disclosure.

It will also be understood that one or more of the components of the systems described herein can have a different configuration without departing from the disclosure. It will be further understood that suitable supporting structures (e.g., bases, legs, platforms, supports, braces, etc.) can be provided to support and facilitate operation of the various components described herein.

It will be further understood that the systems 100, 300, 400 described herein can be configured to form trays from blanks different than those described herein, for example, such as those described in U.S. patent application Ser. No. 17/519,080, filed on Nov. 4, 2021, U.S. patent application Ser. No. 17/519,084, filed on Nov. 4, 2021, U.S. patent application Ser. No. 17/519,092, filed on Nov. 4, 2021, U.S. patent application Ser. No. 17/519,097, filed on Nov. 4, 2021, U.S. patent application Ser. No. 17/519,107, filed on Nov. 4, 2021, U.S. Design patent application Ser. No. 29/785,893, filed on May 27, 2021, U.S. Design patent application Ser. No. 29/785,899, filed on May 27, 2021, U.S. Design patent application Ser. No. 29/785,895, filed on May 27, 2021, U.S. Design patent application Ser. No. 29/785,896, filed on May 27, 2021, U.S. Design patent application Ser. No. 29/785,900, filed on May 27, 2021, U.S. Design patent application Ser. No. 29/785,905, filed on May 27, 2021, and U.S. Design patent application Ser. No. 29/785,902, filed on May 27, 2021, the entire disclosures of which are hereby incorporated by reference for all purposes as if presented herein in their entirety. It will be yet further understood that blanks and trays formed therefrom of a different configuration can be processed/formed in the systems 100, 300 without departing from the disclosure.

In general, the blanks of the present disclosure may be constructed from paperboard having a caliper so that it is heavier and more rigid than ordinary paper. The blank can also be constructed of other materials, such as cardboard, or any other material having properties suitable for enabling the construct to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A system for forming a tray, the system comprising:

an upstream end;

a downstream end;

a blank feeder assembly positioned at an upstream end of the system, the blank feeder assembly comprising a blank infeed configured to receive at least one blank for forming a tray, the blank feeder assembly comprising a blank distribution mechanism configured to engage and move the at least one blank in a machine direction of the system; and a tray forming assembly positioned downstream from the blank feeder assembly, the tray forming assembly comprising a turret assembly comprising a plurality of female tray forming members, the turret assembly further comprising a turret body rotatably mounted to a portion of the system, the tray forming assembly further comprising a piston assembly comprising a male forming member for being at least partially received in a respective female tray forming member of the plurality of female tray forming members for forming a tray from the at least one blank.

2. The system of claim 1, wherein each female tray forming member comprises a tray forming receiver at least partially extending around a tray forming cavity for at least partially receiving a portion of the piston assembly.

3. The system of claim 2, wherein at least one flange forming plate is coupled to the respective tray forming receiver, the flange forming plate extending outwardly from the respective tray forming receiver.

4. The system of claim 2, wherein the male tray forming member comprises a plurality of sides and a bottom, the male tray forming member for being at least partially received in a respective tray forming cavity.

5. The system of claim 4, wherein the plurality of sides of the male tray forming member are obliquely arranged relative to the bottom of the male tray forming member.

6. The system of claim 5, wherein the plurality of female tray forming assemblies are circumferentially arranged about the turret body.

7. The system of claim 4, wherein the male forming member is for being at least partially received in a respective tray forming cavity for at least partially folding the plurality of panels around an interior of the tray.

8. The system of claim 7, wherein the turret body is rotatable for positioning a selected female tray forming member into alignment with the piston assembly.

9. A tray forming assembly, comprising:

a turret assembly comprising a plurality of female tray forming members, the turret assembly further comprising a turret body rotatably mounted to a portion of a tray forming system; and a piston assembly comprising a male forming member for being at least partially received in a respective female tray forming member of the plurality of female tray forming members for forming a tray from at least one blank.

10. The tray forming assembly of claim 9, wherein each female tray forming member comprises a tray forming receiver at least partially extending around a tray forming cavity for at least partially receiving a portion of the piston assembly.

11. The tray forming assembly of claim 10, wherein at least one flange forming plate is coupled to the respective tray forming receiver, the flange forming plate extending outwardly from the respective tray forming receiver.

12. The tray forming assembly of claim 10, wherein the male tray forming member comprises a plurality of sides and a bottom, the male tray forming member for being at least partially received in a respective tray forming cavity.

13. The tray forming assembly of claim 12, wherein the plurality of sides of the male tray forming member are obliquely arranged relative to the bottom of the male tray forming member.

14. The tray forming assembly of claim 13, wherein the plurality of female tray forming assemblies are circumferentially arranged about the turret body.

15. The tray forming assembly of 12, wherein the male forming member is for being at least partially received in a respective tray forming cavity for at least partially folding the plurality of panels around an interior of the tray.

16. The tray forming assembly of claim 15, wherein the turret body is rotatable for positioning a selected female tray forming member into alignment with the piston assembly.

* * * * *